(12) United States Patent
Shimizu et al.

(10) Patent No.: US 12,108,149 B2
(45) Date of Patent: Oct. 1, 2024

(54) IMAGE CAPTURING APPARATUS HAVING FUNCTION OF PHOTOGRAPHING STILL IMAGE DURING MOVING IMAGE PHOTOGRAPHING, AND METHOD OF CONTROLLING SAME

(71) Applicant: CANON KABUSHIKI KAISHA, Tokyo (JP)

(72) Inventors: Katsunori Shimizu, Tokyo (JP); Shigeyoshi Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 124 days.

(21) Appl. No.: 18/155,393

(22) Filed: Jan. 17, 2023

(65) Prior Publication Data

US 2023/0232099 A1   Jul. 20, 2023

(30) Foreign Application Priority Data

Jan. 20, 2022   (JP) ................................. 2022-007148

(51) Int. Cl.
*H04N 23/667* (2023.01)
*G06V 10/60* (2022.01)
*H04N 23/63* (2023.01)

(52) U.S. Cl.
CPC ........... *H04N 23/667* (2023.01); *G06V 10/60* (2022.01); *H04N 23/632* (2023.01)

(58) Field of Classification Search
None
See application file for complete search history.

(56) References Cited

U.S. PATENT DOCUMENTS

| 11,843,854 B2 * | 12/2023 | Hoshika ................. H04N 7/012 |
| 2023/0232126 A1 * | 7/2023 | Ito ............................. G06T 3/40 |
| | | 348/220.1 |

FOREIGN PATENT DOCUMENTS

JP   2021-129321 A   9/2021

* cited by examiner

*Primary Examiner* — Cynthia Segura
(74) *Attorney, Agent, or Firm* — Cowan, Liebowitz & Latman, P.C.

(57) ABSTRACT

An image capturing apparatus capable of keeping constant the update interval of a display section even when still image photographing is performed during moving image photographing. In the image capturing apparatus, by controlling a storage time period during which display image data is stored in a storage section, a time period from a frame start to the start of displaying image data with a first resolution is made equal to a time period from a frame start to the start of displaying image data with a third resolution. Further, by controlling changing the start timing of reading out image data with a second resolution, the update interval of the display image data is kept constant.

18 Claims, 9 Drawing Sheets

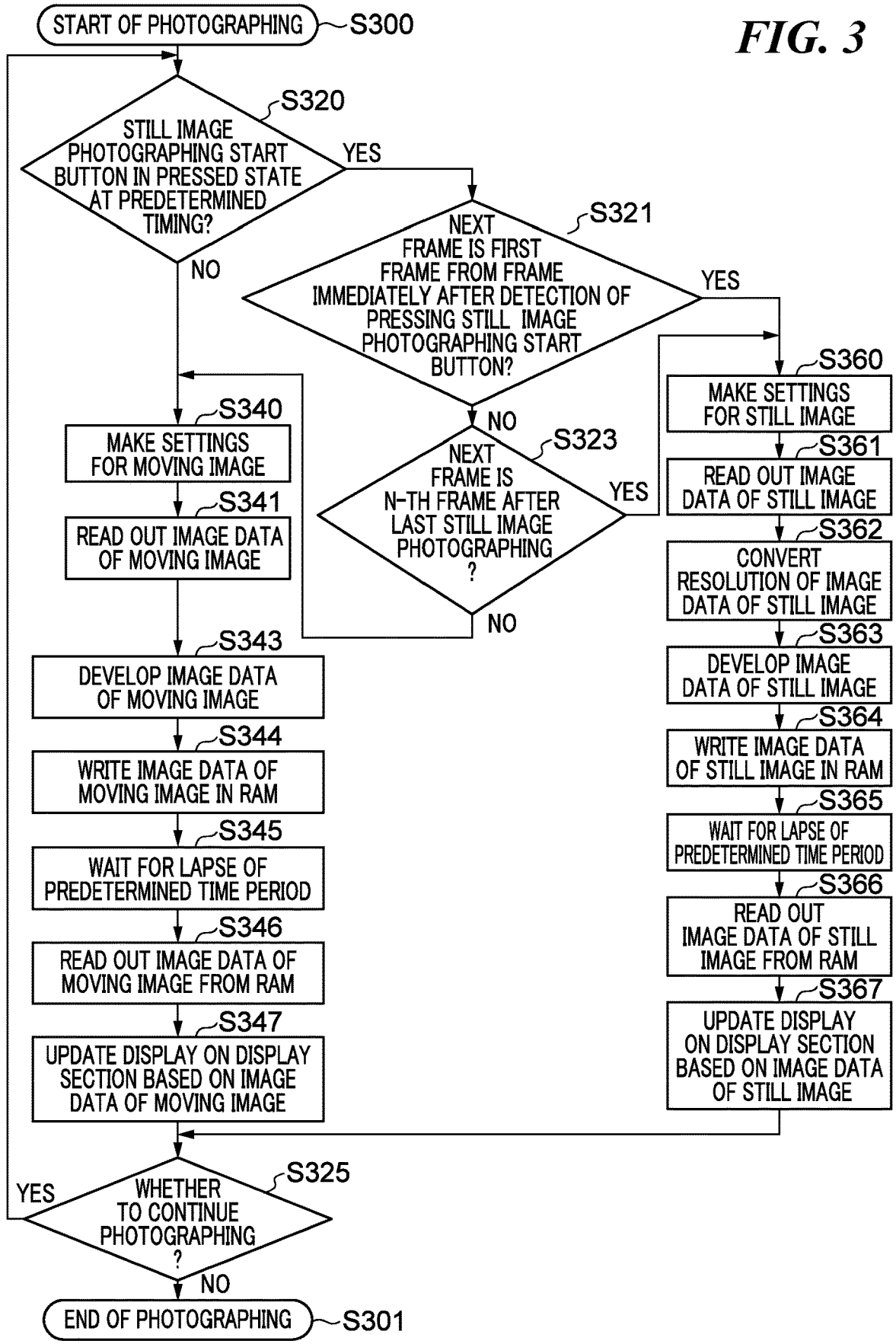

A: RESOLUTION CONVERTED STILL IMAGE 3
B: RESOLUTION CONVERTED STILL IMAGE 6

D: RESOLUTION CONVERTED STILL IMAGE 4
E: RESOLUTION CONVERTED STILL IMAGE 7

IMAGE CAPTURING APPARATUS HAVING FUNCTION OF PHOTOGRAPHING STILL IMAGE DURING MOVING IMAGE PHOTOGRAPHING, AND METHOD OF CONTROLLING SAME

BACKGROUND OF THE INVENTION

Field of the Invention

The present invention relates to an image capturing apparatus that has a function of photographing a still image during moving image photographing, and a method of controlling the same.

Description of the Related Art

Conventionally, when an image capturing apparatus performs still image photographing during moving image photographing, it has been necessary to interrupt the moving image photographing and read out image data of a still image. Japanese Laid-Open Patent Publication (Kokai) No. 2021-129321 discloses an image capturing apparatus that converts image data of a still image to image data of a moving image and displays the image data of the moving image. With this, Japanese Laid-Open Patent Publication (Kokai) No. 2021-129321 proposes an image capturing apparatus that does not require interruption of moving image photographing even when still image photographing is performed during the moving image photographing.

However, the conventional technique disclosed in Japanese Laid-Open Patent Publication (Kokai) No. 2021-129321 has a problem that there is a difference between a time period from the start of a moving image frame to the start of displaying image data of the moving image frame and a time period from the start of a still image frame to the start of displaying image data generated by converting the size (data amount) of image data of the still image frame to the size (data amount) of a moving image frame. For this reason, when still image photographing is performed during moving image photographing, it is sometimes impossible to keep constant the display update interval of a display section. In this case, when the update interval of the display section is made longer than before, the user is given a feeling that the screen is sluggish.

SUMMARY OF THE INVENTION

The present invention provides an image capturing apparatus that is capable of keeping constant the update interval of a display section even when still image photographing is performed during moving image photographing, and a method of controlling the same.

In a first aspect of the present invention, there is provided an image capturing apparatus having a live view function, including a pixel array that has a plurality of photoelectric conversion elements arranged in a matrix, a readout section that is capable of reading out first image data with a first resolution and second image data with a second resolution from the pixel array, an operation section that is operated to give an instruction signal indicative of a start of reading out the image data with the second resolution, a resolution conversion section configured to convert the image data with the second resolution, which is read out from the pixel array based on the instruction signal, to image data with a third resolution, an output section that is capable of outputting the image data with the first resolution, which is read out, and the image data with the third resolution, a generation section configured to generate display image data based on image data output from the output section, a storage section that stores the display image data, and a display section that displays the display image data, wherein a storage time period during which the storage section stores the display image data is controlled to thereby equalize a time period from a frame start to a start of displaying the image data with the first resolution by the display section and a time period from a frame start to a start of displaying the image data with the third resolution by the display section.

In a second aspect of the present invention, there is provided an image capturing apparatus having a live view function, including a pixel array that has a plurality of photoelectric conversion elements arranged in a matrix, a readout section that is capable of reading out first image data with a first resolution and second image data with a second resolution from the pixel array, an operation section that is operated to give an instruction signal indicative of a start of reading out the image data with the second resolution, a resolution conversion section configured to convert the image data with the second resolution, which is read out from the pixel array based on the instruction signal, to image data with a third resolution, an output section that is capable of outputting the image data with the first resolution, which is read out, and the image data with the third resolution, a generation section configured to generate display image data based on image data output from the output section, a storage section that stores the display image data, and a display section that displays the display image data, wherein an update interval of the display image data to be displayed by the display section is kept constant by controlling changing a start timing of reading out the image data with the second resolution.

According to the present invention, it is possible to keep constant the update interval of a display section when still image photographing is performed during moving image photographing.

Further features of the present invention will become apparent from the following description of exemplary embodiments (with reference to the attached drawings).

BRIEF DESCRIPTION OF THE DRAWINGS

FIG. 3 is a flowchart of an image capturing process performed by the image capturing apparatus according to first to third embodiments.

DESCRIPTION OF THE EMBODIMENTS

The present invention will now be described in detail below with reference to the accompanying drawings showing embodiments thereof.

However, the configurations described in the following embodiments are described by way of example, and are by no means intended to limit the scope of the invention to the described configurations. First, a description is given of the first embodiment of the present invention.

Figure 1:
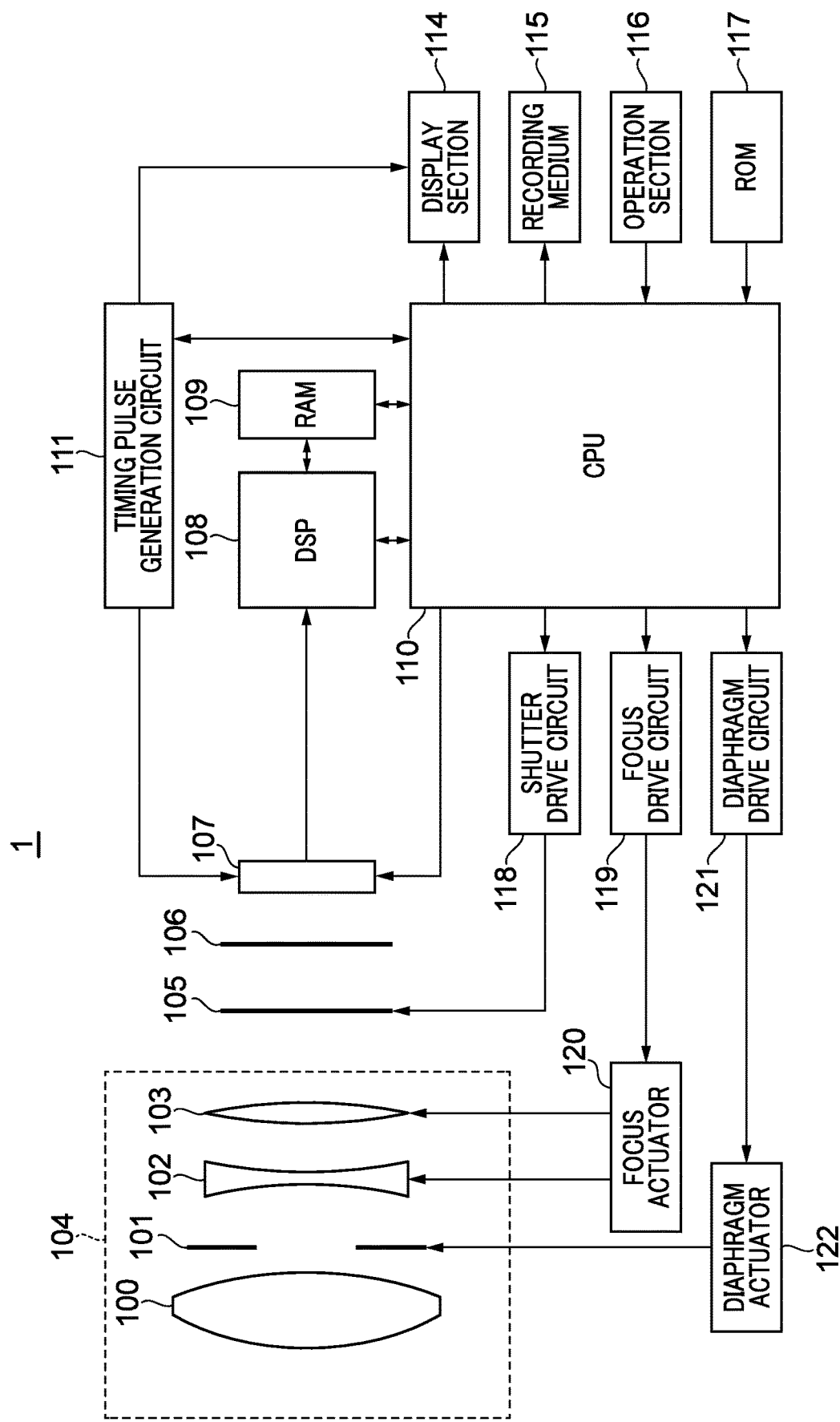
FIG. 1 is a block diagram of an image capturing apparatus according to embodiments of the present invention.

FIG. 1 is a block diagram of an image capturing apparatus 1 according to the first embodiment. The image capturing apparatus 1 includes an image capturing optical system 104. The image capturing optical system 104 is comprised of a first lens 100, a diaphragm 101, a second lens 102 and a third lens 103. The first lens 100 is disposed on a front end of the image capturing optical system 104. The diaphragm 101 adjusts an aperture diameter thereof to thereby adjust the amount of incident light when photographing is performed. A diaphragm actuator 122 drives the diaphragm 101 to adjust the aperture diameter. The second lens 102 and the third lens 103 are driven by a focus actuator 120 to move forward and backward in an optical axis direction, for adjusting the focus of the photographic optical system 104.

A focal plane shutter 105 and an optical low-pass filter 106 are disposed on the rear side of the photographic optical system 104 in the optical axis direction. The focal plane shutter 105 has a function of adjusting the exposure time in still image photographing. However, when an electronic shutter is used to adjust the exposure time for slot rolling readout, the adjustment of the exposure time is not performed. The optical low-pass filter 106 is used for reducing moire and false color of a photographed image.

An image sensor 107 is disposed on the rear side of the optical low-pass filter 106 in the optical axis direction. The image sensor 107 photoelectrically converts an optical image of an object formed through the photographic optical system 104 to electrical signals. Further, the image sensor 107 has an electronic shutter function and is capable of acquiring an image by slot rolling readout.

Connected to a CPU 110 are a shutter drive circuit 118, a focus drive circuit 119, a diaphragm drive circuit 121, a DSP 108 (generation section), a RAM 109, a timing pulse generation circuit 111, a display section 114, a recording medium 115, an operation section 116, and a ROM 117. Note that the timing pulse generation circuit 111 is also connected to the image sensor 107 and the display section 114. The DSP 108 receives image data and performs image processing on the image data. Examples of the image processing performed by the DSP 108 include generation of image data for display from image data of a still image. Further, in addition to the image processing, the DSP 108 calculates control information used for driving focus lenses (the second lens 102 and the third lens 103) based on information from the image sensor 107.

The RAM 109 has a function as image data storage means for storing image data processed by the DSP 108, and a function as a work memory for the operation of the CPU 110, described hereinafter. Although the present embodiment is configured such that these functions are realized using the RAM 109, it is also possible to use any other type of memory insofar as it can be accessed at a sufficiently high speed without causing an operational problem. Further, although in the present embodiment, the RAM 109 is disposed outside the DSP 108 and the CPU 110, part of or all of the functions of the RAM 109 may be incorporated in the DSP 108 and the CPU 110. The ROM 117 stores programs for the CPU 110 to control the operations of the components.

The CPU 110 performs centralized control of the image capturing apparatus 1. The CPU 110 executes programs stored in the ROM 117 so as to control the components of the image capturing apparatus 1. By making a variety of settings for the image sensor 107, the CPU 110 is capable of controlling readout of information from the image sensor 107. Further, the CPU 110 communicates with the timing pulse generation circuit 111 to control the timing of generating a variety of timing pulses for controlling the operations of modules. The CPU 110 supplies an image capturing system vertical synchronization signal to the image sensor 107, and a display system vertical synchronization signal to the display section 114. Furthermore, the CPU 110 has a function of adjusting the focus of the photographic optical system 104, by controlling the focus drive circuit 119 to drive the focus actuator 120, using results of computation output from the DSP 108.

The shutter drive circuit 118 controls driving of the focal plane shutter 105. The focus drive circuit 119 is focus position change means for changing the focus position of the photographic optical system 104, and controls the focus actuator 120 based on the output from the CPU 110. With this, the focus lenses (the second lens 102 and the third lens 103) are driven to move forward and backward in the optical axis direction, for adjusting the focus of the photographic optical system 104. The diaphragm drive circuit 121 controls the diaphragm actuator 122 to thereby control the aperture of the diaphragm 101.

The display section 114 displays a still image and a moving image, processed by the DSP 108, a menus, and the like Further, the image capturing apparatus 1 has a live view (LV) function for displaying the moving image processed by the DSP 108 on the display section 114. Further, by using the display section 114 as a viewfinder for viewing a displayed moving image, it is possible for a user to perform framing for adjusting a photographing range for photographing a still image or a moving image. As the display section 114, not only a rear display but also an electronic viewfinder (EVF) or the like may be used. Note that the image capturing apparatus 1 shown in FIG. 1 is configured to have only one display section 114, the image capturing apparatus 1 may include both the rear display and the EVF. The recording medium 115 is removably mounted on the image capturing apparatus 1 and records image data of still images and image data of moving images. For example, the recording medium 115 can be implemented by a memory card or the like.

The operation section 116 is comprised of operation elements, such as buttons and levers. The user controls the CPU 110 by operating the operation section 116 to perform photographing. The operation section 116 includes a still image photographing start button and a menu operation button. When the user half-presses the still image photographing start button, photographing of a moving image for performing ranging is performed after a predetermined time period has elapsed. Further, when the user preforms a pressing operation of the still image photographing start button, photographing of a still image is performed after a predetermined time period has elapsed. Furthermore, by continuing the pressing operation of the still image photographing start button even after the start of the still image photographing, the user performs continuous photographing of the still image. Further, by operating the menu operation button, the user can change photographing conditions from a menu displayed on the display section 114.

Figure 2A:
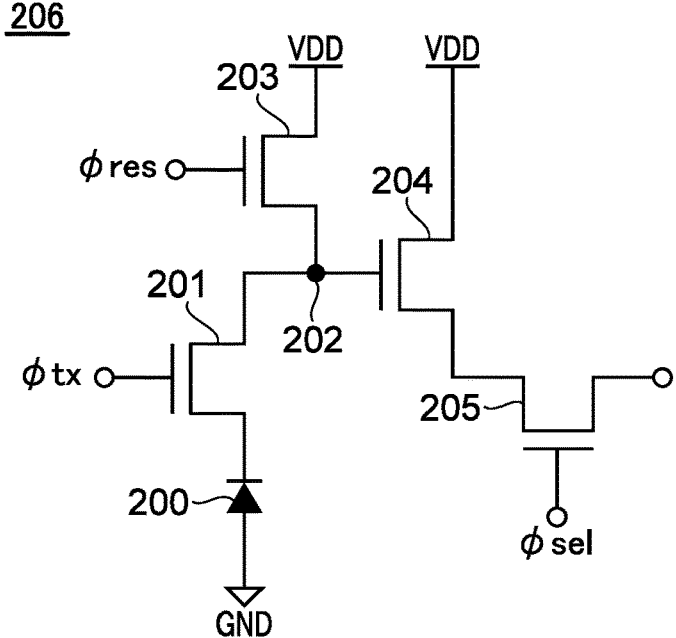
FIG. 2A is a circuit diagram of a unit pixel.

Next, the configuration of the image sensor 107 will be described with reference to FIGS. 2A and 2B. As shown in FIG. 2A, a unit pixel 206 has a photodiode 200 which is disposed as a component under a micro lens, not shown, and operates as a photoelectric converter. A photoelectric converter transfer switch 201 is controlled by a signal φtx. By setting the value of the signal φtx to high (hereinafter referred to as "H"), it is possible to transfer photo-charge accumulated in the photodiode 200 to a floating diffusion node 202.

A reset switch 203 is controlled by a signal φres to initialize the floating diffusion node 202. A pixel reset operation sets both of the signals φtx and ores to "H". With this, both the photodiode 200 and the floating diffusion node 202 are caused to have a power supply voltage (VDD), whereby the pixel is reset. A pixel amplifier transistor 204 is connected to a constant current source 209, appearing in FIG. 2B and referred to hereinafter, via a select switch 205 and a vertical output line 208, appearing in FIG. 2B and referred to hereinafter, When the value of an input signal φsel of the select switch 205 is set to "H", the pixel amplifier transistor 204 is connected to the constant current source 209, whereby a pixel amplifier is formed. The floating diffusion node 202 is connected to this pixel amplifier. Therefore, the charge transferred from the photodiode 200 to the floating diffusion node 202 is converted by the pixel amplifier to a voltage value corresponding to the amount of the charge, and is output as a pixel signal to the vertical output line 208.

Figure 2B:
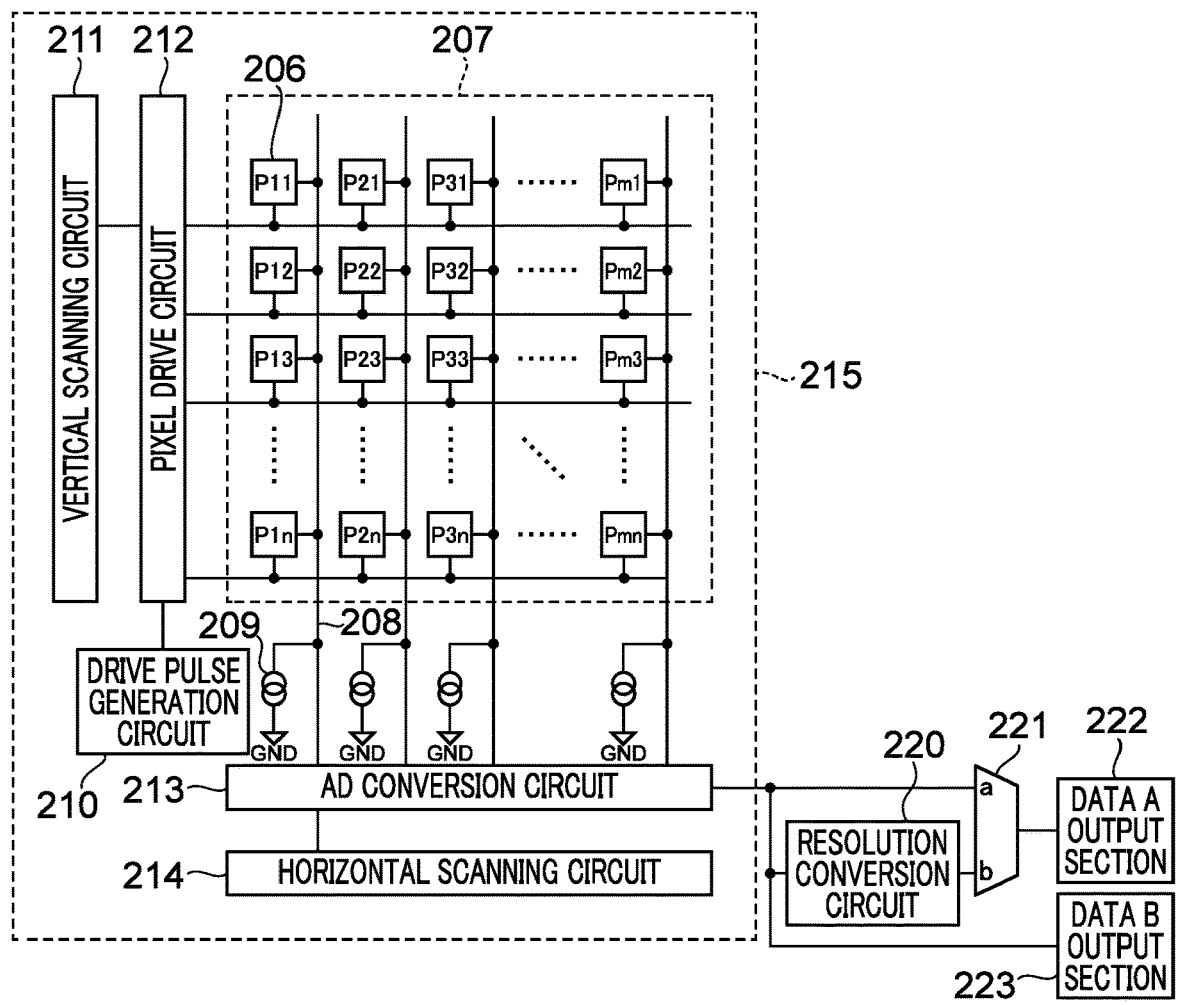
FIG. 2B is a configuration diagram of a pixel array and peripheral circuits.

As shown in FIG. 2B, a pixel array 207 has a plurality of unit pixels 206 arranged in a matrix. More specifically, there are arranged "m" unit pixels 206 in a horizontal direction (row direction) and "n" unit pixels 206 in a vertical direction (column direction). Note that "m" and "n" represent natural numbers. Thus, the pixel array 207 is formed by a plurality of photoelectric conversion elements arranged in a matrix. A drive pulse generation circuit 210 generates a pulse for performing a reset operation and a readout operation of each unit pixel 206. The generated pulse is supplied to a pixel drive circuit 212. A vertical scanning circuit 211 selects a specific row to which the pulse generated by the drive pulse generation circuit 210 is to be supplied and sets the selected row in the pixel drive circuit 212. The pixel drive circuit 212 supplies the pulse generated by the drive pulse generation circuit 210 to the row selected by the vertical scanning circuit 211. Pixel signals are output to the vertical output lines 208 on a row-by-row basis according to the pulse supplied from the pixel drive circuit 212.

The constant current source 209 forms a source follower circuit in combination with the pixel amplifier transistor 204. An AD conversion circuit 213 converts analog values of the pixel signals output to the vertical output lines 208 to digital values corresponding to the output values. The pixel signals converted to the digital values by the AD conversion circuit 213 are sequentially selected by a horizontal scanning circuit 214, and are output to a downstream stage. The pixel array 207, the vertical output lines 208, the constant current sources 209, the drive pulse generation circuit 210, the vertical scanning circuit 211, the pixel drive circuit 212, the AD conversion circuit 213, and the horizontal scanning circuit 214 form a pixel scanning section 215 (readout section).

A resolution conversion circuit 220 (resolution conversion section) generates image data which is formed by being subjected to resolution conversion in which the size (data amount) of image data of a still image is converted to the size (data amount) of a moving image (hereinafter also referred to as the moving image size). A selector 221 selects one of an input "a" for directly inputting an output from the AD conversion circuit 213 to a data A output section 222 (output section) and an input "b" for inputting the output from the AD conversion circuit 213 to the data A output section 222 via the resolution conversion circuit 220. The data A output section 222 is an interface for outputting an output from the selector 221, to the outside of the image sensor 107. The data A output section 222 outputs the image data of the moving image and the image data formed by being subjected to resolution conversion in which the size (data amount) of image data of the still image is converted to the size (data amount) of the moving image (hereinafter also expressed as "resolution conversion in which the resolution of the image data of the still image is converted to the resolution corresponding to the moving image size"), to the outside of the image sensor 107. Ae data B output section 223 is an interface for outputting an output from the AD conversion circuit 213, to the outside of the image sensor 107, and outputs the image data of the still image to the outside of the image sensor 107.

In the present embodiment, there has been described, by way of example, the case where the image sensor 107 is provided with two output sections so as to output image data of a still image to the outside. However, the image sensor 107 may be configured such that it has a memory incorporated therein, and stores image data of a still image in the memory to output the image data of the still image at a timing that does not overlap with the timing of outputting image data of a moving image. With this configuration, the number of the output sections of the image sensor 107 can be reduced to one.

It is assumed that the image sensor 107 in the present embodiment can perform a plurality of image reading methods by changing the driving of the pixel scanning section 215. For example, in the present embodiment, there is employed a method of reading out a still image, in which after reading out the top row of pixels, an operation of reading out the following lower row of pixels is performed, and this operation is repeatedly performed sequentially with respect to the following lower rows of pixels to the bottom row of pixels. Further, there is employed a method of reading out a moving image, in which after reading out the top row of pixels, an operation of reading out a following lower row of pixels by skipping several (e.g. two) rows of pixels is performed, and this operation is repeatedly performed sequentially with respect to the following lower rows of pixels to the bottom row of pixels.

By reading out image data of a moving image as described above, it is possible to perform a readout operation of image data at high speed and with low power consumption although the vertical resolution of the image is reduced. Alternatively, it is possible to employ any suitable one of a variety of other image reading methods. Note that although in the present embodiment, circuits other than the pixel array 207 are also incorporated in the image sensor 107, the circuits other than the pixel array 207 may be configured to be provided in a chip other than the image sensor 107. Note that the resolution of image data of a live view moving image is lower than that of image data of a still image.

First, with reference to FIGS. 3 and 4, a description will be given of a process in which it is impossible to keep constant the update interval of the display section 114 in a case where still image photographing is performed during moving image photographing without applying the present embodiment. The process shown in FIG. 3 is realized by the CPU 110 that executes an associated program stored in the ROM 117. At a time T402 in FIG. 4, photographing is started. Photographing may be started immediately after power-on of the image capturing apparatus 1, but this is not limitative. At a time T410, a step S320 is executed to determine whether or not a still image photographing start button is in the pressed state at a predetermined timing. In this step, it is determined whether or not the still image photographing start button is in the pressed state at the start of each frame. In other words, the predetermined timing is the start of each frame.

At the time T410, it is determined in the step S320 that the still image photographing start button is not in the pressed state at the start of a frame 0 (at the start of photographing at the time T402), so that the process proceeds to a step S340, wherein settings of the moving image are configured. The CPU 110 makes settings of the image sensor 107, for reading out image data of the moving image, and makes settings of the DSP 108, for developing the image data of the moving image. Further, the CPU 110 makes settings of the timing pulse generation circuit 111 for the image capturing system vertical synchronization signal and the display system vertical synchronization signal, and makes settings of the display section 114 for displaying the image data of the moving image.

Further, the CPU 110 sets a timing for starting to read out the image data of the moving image from the RAM 109. To output the image data of the moving image from the data A output section 222, the CPU 110 sets the selector 221 of the image sensor 107 to the input "a". The timing for starting to read out the image data of the moving image from the RAM 109 is set to a time point at which a predetermined time period tS (corresponding to a time period from a time T412 to a time T414) elapses after the frame start time.

At the time T412, the CPU 110 starts issuing the image capturing system vertical synchronization signal and starts readout of the image data of the moving image in a step S341. Also at the time T412, development of the image data of the moving image in a step S343 is started and writing of the image data of the moving image in the RAM 109 in a step S344 is started. Further at the time T412, the CPU 110 starts waiting for the lapse of a predetermined time period (the predetermined time period tS in FIG. 4) in a step S345. At the time T414, the CPU 110 starts issuing the display system vertical synchronization signal and starts readout of the image data of the moving image from the RAM 109 in a step S346. Also at the time T414, update of display on the display section 114 based on the image data of the moving image in a step S347 is started.

At a time T420, the CPU 110 executes a step S325 to determine whether or not to continue the photographing. If it is determined in the step S325 that the photographing is to be continued (YES to the step S325), the process returns to the step S320. On the other hand, if t is determined in the step S325 that the photographing is not to be continued (NO to the step S325), the process proceeds to a step S301 to terminate the photographing. For example, in a case where a menu is to be displayed on the display section 114 or if a power switch, not shown, is turned off, it is determined that the photographing is not to be continued, so that the photographing is terminated.

At the time T420, if it is determined in the step S325 that the photographing is to be continued (YES to the step S325), the CPU 110 determines again in the step S320 whether or not the still image photographing start button is in the pressed state at the start of the present frame. Since it is determined that the still image photographing start button is not in the pressed state at the start of a frame 1, the answer to the question of the step S320 is negative (NO). Thereafter, at a time T424, update of display on the display section 114 based on the image data of the moving image in the step S347 is started. The steps S340 to S347 executed from the time T420 to the time T424 are the same as the steps S340 to S347 executed from the time T410 to the time T414. However, it is assumed in the illustrated example that the still image photographing start button is pressed at a time T421, and the pressed state of the button continues thereafter. At a time T430, the CPU 110 determines in the step S325 whether or not to continue the photographing. The answer to the question of the step S325 is affirmative (YES), so that the process returns to the step S320.

At the time T430, the CPU 110 determines again in the step S320 whether or not the still image photographing start button is in the pressed state at the start of the present frame. Since it is determined that the still image photographing start button is in the pressed state at the start of a frame 2, the answer to the question of the step S320 is affirmative (YES), so that the process proceeds to a step S321. Also at the time T430, it is determined in the step S321 whether or not the next frame is the first frame from the frame (during which this determination is performed) immediately after detection of pressing the still image photographing start button. Since a frame 3 is the first frame from the frame immediately after detection of pressing the still image photographing start button, the answer to the question of the step S321 is affirmative (YES), so that the process proceeds to a step S360.

Also at the time T430, the CPU 110 makes settings of the still image in the step S360. More specifically, the CPU 110 makes settings of the image sensor 107 for reading out image data of the still image, and makes settings of the DSP 108 for developing the image data of the still image. Further, the CPU 110 makes settings of the timing pulse generation circuit 111 for the image capturing system vertical synchronization signal and the display system vertical synchronization signal, and makes settings of the display section 114 for displaying the image data of the still image.

Further, the CPU 110 sets a timing for starting to read out the image data of the still image from the RAM 109. To output the image data of the still image subjected to the resolution conversion, from the data A output section 222, the CPU 110 sets the selector 221 of the image sensor 107 to the input "b". The timing for starting to read out the image data of the still image from the RAM 109 is set to a time point at which a predetermined time period tL=tS+tD (corresponding to a time period from a time T432 to a time T434) elapses after the frame start time. A time period tD represents a latency required to perform resolution conversion in which the resolution of the image data of the still image is converted to the resolution corresponding to the moving image size.

At the time T432, the CPU 110 starts issuing the image capturing system vertical synchronization signal and starts readout of the image data of the still image in a step S361. At a time T433, the resolution conversion in a step S362 starts to be performed to convert the resolution of the image data of the still image to the resolution corresponding to the moving image size. Then, development of the image data of the still image in a step S363 is started and then writing of the image data of the still image (resolution converted still image 3) in the RAM 109 in a step S364 is started. After that, the CPU 110 waits in a step S365 until the predetermined time period tL=tS+tD elapses after the frame start time. At the time T434, the CPU 110 starts issuing the display system vertical synchronization signal and starts readout of the image data of the still image (resolution converted still image 3) from the RAM 109 in a step S366. Also at the time T434, update of display on the display section 14 based on the image data of the still image (resolution converted still image 3) in a step S367 is started. At a time T440, the CPU 110 determines in the step S325 whether or not to continue the photographing. The answer to the question of the step S325 is affirmative (YES), so that the process returns to the step S320.

At the time T440, the CPU 110 determines again in the step S320 whether or not the still image photographing start button is in the pressed state at the start of the present frame. Since the still image photographing start button is in the pressed state at the start of the frame 3, the answer to the question of the step S320 is affirmative (YES), so that the process proceeds to the step S321. Also at the time T440, it is determined in the step S321 whether or not the next frame is the first frame from the frame (during which this determination is performed) immediately after detection of pressing the still image photographing start button. Since a frame 4 is the second frame from the frame immediately after detection of pressing the still image photographing start button, the answer to the question of the step S321 is negative (NO), so that the process proceeds to a step S323. Also at the time T440, it is determined in the step S323 whether or not the next frame is an N-th frame after the last still image photographing. In the present embodiment, N is set to 3, and the frame 4 is the first frame from the last still image photographing. Therefore, the answer to the question of the step S323 is negative (NO), so that the process proceeds to the step S340.

After that, at a time T444, update of display on the display section 114 based on the image data of the moving image in the step S347 is started. The steps S340 to S347 executed from the time T440 to the time T444 are the same as the steps S340 to S347 executed from the time T410 to the time T414. At a time T450, the CPU 110 determines in the step S325 whether or not to continue the photographing. The answer to the question of the step S325 is affirmative (YES), so that the process returns to the step S320.

At the time T450, the CPU 110 determines again in the step S320 whether or not the still image photographing start button is in the pressed state at the start of the present frame. It is determined that the still image photographing start button is in the pressed state at the start of the frame 4, and hence the answer to the question of the step S320 is affirmative (YES), so that the process proceeds to the step S321. Also at the time T450, it is determined in the step S321 whether or not the next frame is the first frame from the frame (during which this determination is performed) immediately after detection of pressing the still image photographing start button. Since a frame 5 is the third frame from the frame immediately after detection of pressing the still image photographing start button, the answer to the question of the step S321 is negative (NO), so that the process proceeds to the step S323. Also at the time T450, it is determined in the step S323 whether or not the next frame is the N-th frame after the last still image photographing. In the present embodiment, N=3 holds, and the frame 5 is the second frame from the last still image photographing. Therefore, the answer to the question of the step S323 is negative (NO), so that the process proceeds to the step S340.

After that, at a time T454, update of display on the display section 114 based on the image data of the moving image in the step S347 is started. The steps S340 to S347 executed from the time T450 to the time T454 are the same as the steps S340 to S347 executed from the time T410 to the time T414. At a time T460, the CPU 110 determines in the step S325 whether or not to continue the photographing. The answer to the question of the step S325 is affirmative (YES), so that the process returns to the step S320.

At the time T460, the CPU 110 determines again in the step S320 whether or not the still image photographing start button is in the pressed state at the start of the present frame. It is determined in the step S320 that the still image photographing start button is in the pressed state at the start of the frame 5, and hence the answer to the question of the step S320 is affirmative (YES), so that the process proceeds to the step S321. Also at the time T460, it is determined in the step S321 whether or not the next frame is the first frame from the frame (during which this determination is performed) immediately after detection of pressing the still image photographing start button. Since a frame 6 is the fourth frame from the frame immediately after detection of pressing the still image photographing start button, the answer to the question of the step S321 is negative (NO), so that the process proceeds to the step S323. Also at the time T460, it is determined in the step S323 whether or not the next frame is the N-th frame after the last still image photographing. In the present embodiment, since N=3 holds and the frame 6 is the third frame from the last still image photographing, the answer to the question of the step S323 is affirmative (YES), so that the process proceeds to the step S360.

After that, at a time T464, update of display on the display section 114 based on the image data of the still image (resolution converted still image 6) in the step S367 is started. The steps S360 to S367 executed from the time T460 to the time T464 are the same as the steps S360 to S367 executed from the time T430 to the time T434. At a time T470, the CPU 110 determines in the step S325 whether or not to continue the photographing. The answer to the question of the step S325 is affirmative (YES), so that the process returns to the step S320. Further, the steps S340 to S347 executed from the time T470 to a time T484 are the same as the steps S340 to S347 executed from the time T440 to the time T454.

Figure 4:
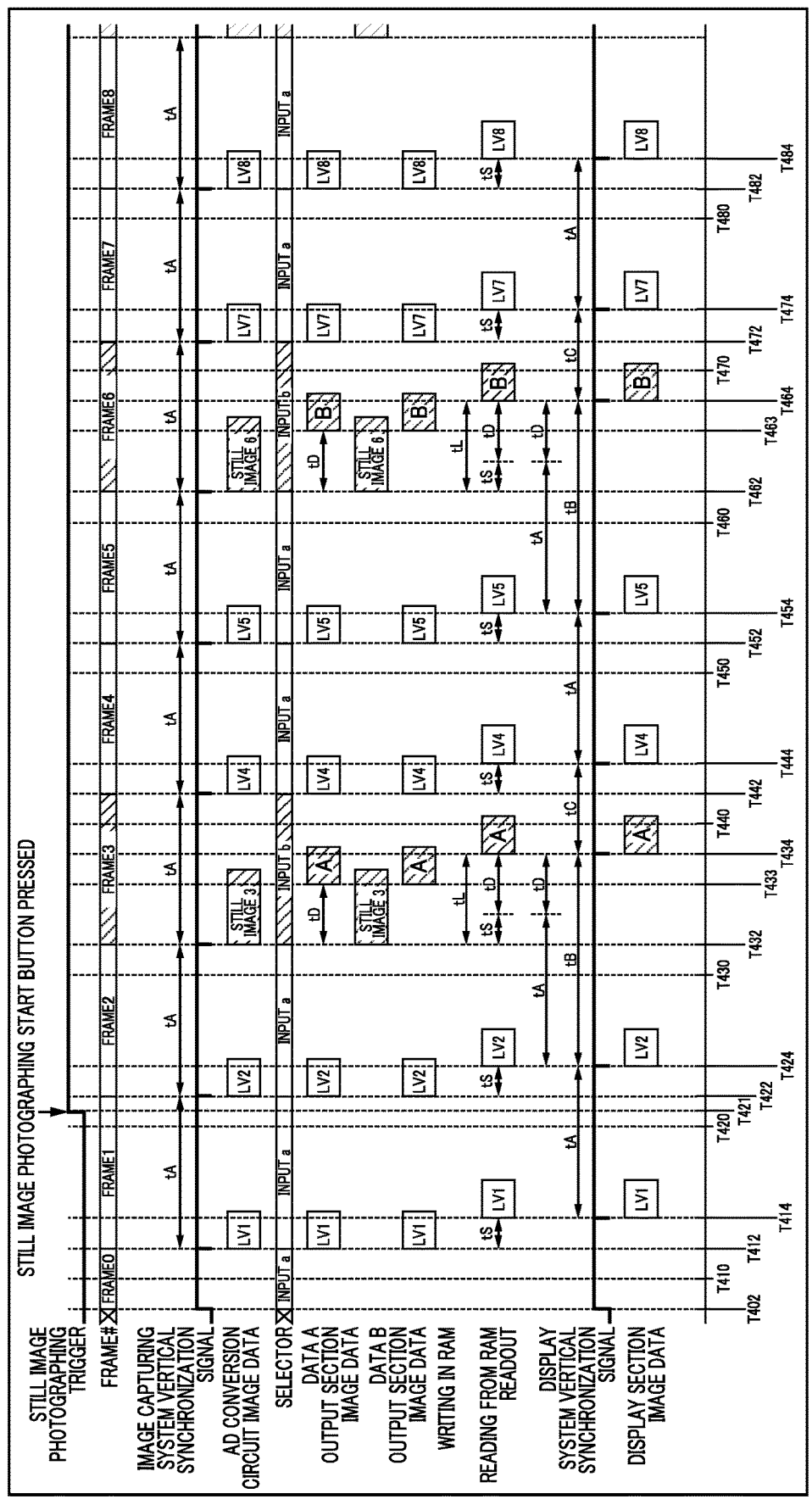
FIG. 4 is a view useful in explaining the timing of an image capturing operation in a case where the present invention is not applied.

Here, assuming that the interval of the image capturing system vertical synchronization signal is a time period tA as shown in FIG. 4, the interval of the display system vertical synchronization signal before the start of the still image photographing is the time period tA. On the other hand, during the still image photographing, the interval of the display system vertical synchronization signal is one of the time period tA, a time period tB=tA+tD, and a time period tC=tA−tD, and hence it is impossible to keep constant the update interval of the display section 114.

To keep constant the update interval of the display section 114, embodiments of the present invention described hereinafter are characterized in that the timing of reading out image data of a moving image from the RAM 109 is controlled so as to make it different between moving image photographing before still image photographing and moving image photographing during still image photographing.

Figure 5:
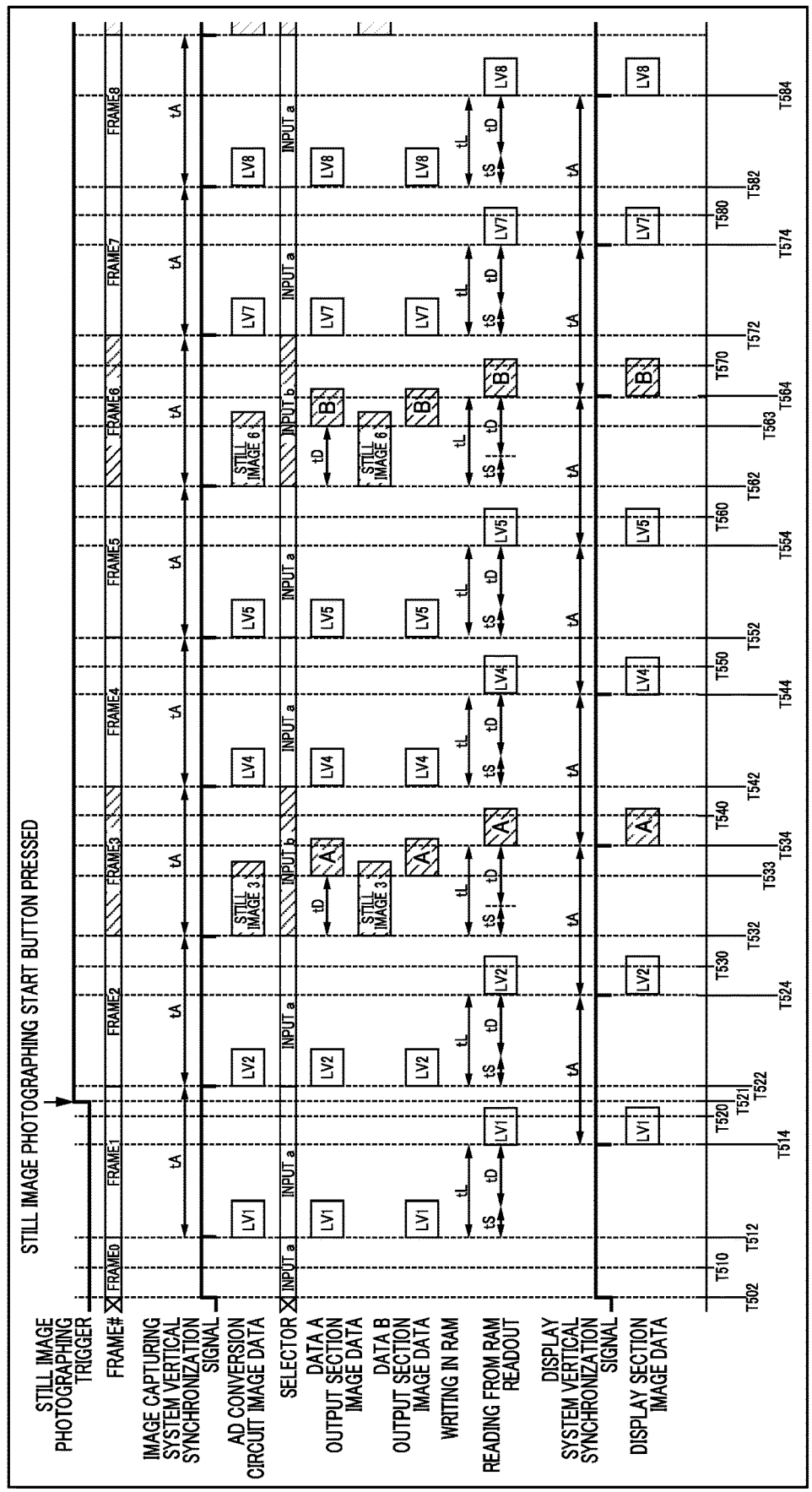
FIG. 5 is a view useful in explaining the timing of an image capturing operation of the image capturing apparatus according to a first embodiment.

FIG. 5 is a view useful in explaining the timing of an image capturing operation of the image capturing apparatus 1 according to the first embodiment. With reference to FIGS. 3 and 5, a description will be given of a process performed in the first embodiment, in which the update interval of the display section 114 is kept constant when performing still image photographing during moving image photographing.

The process shown in FIG. 3 is performed by the CPU 110 which executes the associated program stored in the ROM 117.

At a time T502, photographing is started in the step S300. Although this photographing may be started immediately after power-on of the image capturing apparatus 1, this is not limitative. At a time T510, the CPU 110 determines in the step S320 whether or not the still image photographing start button is in the pressed state at a predetermined timing. In the present embodiment, it is determined whether or not the still image photographing start button is in the pressed state at the start of each frame. In other words, the predetermined timing is the start of each frame. At the time T510, it is determined in the step S320 that the still image photographing start button is not in the pressed state at the start of a frame 0 (at the start of photographing at the time T502), so that the process proceeds to the step S340. Also at the time T510, the CPU 110 makes settings of a moving image in the step S340. More specifically, the CPU 110 makes settings of the image sensor 107 for reading out image data of the moving image and makes settings of the DSP 108 for developing the image data of the moving image.

Further, the CPU 110 makes settings of the timing pulse generation circuit 111 for the image capturing system vertical synchronization signal and the display system vertical synchronization signal, and makes settings of the display section 114 for displaying the image data of the moving image. Further, the CPU 110 sets a timing for starting to read out the image data of the moving image from the RAM 109. To output the image data of the moving image from the data A output section 222, the CPU 110 sets the selector 221 of the image sensor 107 to the input "a". The timing for starting to read out the image data of the still image from the RAM 109 is set to a time point at which the predetermined time period tL=tS+tD (corresponding to a time period from a time T512 to a time T514) elapses after the frame start time. The time period tD represents a latency required to perform resolution conversion in which the resolution of the image data of the still image is converted to the resolution corresponding to the moving image size, and the amount of the latency is uniquely determined by a still image readout time and the image sizes of the still images before and after the conversion. Therefore, the time period tD can be calculated even during moving image photographing before still image photographing.

At the time T512, the CPU 110 starts issuing the image capturing system vertical synchronization signal and starts readout of the image data of the moving image in the step S341. Also at the time T512, development of the image data of the moving image in the step S343 is started, and writing of the image data of the moving image in the RAM 109 in the step S344 is started. Also at the time T512, the CPU 110 starts waiting for the lapse of the predetermined time period tL=tS+tD in the step S345. At the time T514, the CPU 110 starts issuing the display system vertical synchronization signal and starts readout of the image data of the moving image from the RAM 109 in the step S346. Also at the time T514, update of display on the display section 114 based on the image data of the moving image in the step S347 is started.

At a time T520, the CPU 110 determines in the step S325 whether or not to continue the photographing. If the photographing is to be continued (YES to the step S325), the process returns to the step S320. On the other hand, if the photographing is not to be continued (NO to the step S325), the photographing is terminated in the step S301. For example, if a menu is displayed on the display section 114 or if the power switch is turned off, it is determined that the photographing is not to be continued, so that the photographing is terminated.

At the time T520, if it is determined in the step S325 that the photographing is to be continued (YES to the step S325), the CPU 110 determines again in the step S320 whether or not the still image photographing start button is in the pressed state at the start of the present frame. Since the CPU 110 determines that the still image photographing start button is not in the pressed state at the start of the frame 1, the answer to the question of the step S320 is negative (NO), so that the process proceeds to the step S340. After that, at a time T524, update of display on the display section 114 based on the image data of the moving image in the step S347 is started. The steps S340 to S347 executed from the time T520 to the time T524 are the same as the steps S340 to S347 executed from the time T510 to the time T514. However, at a time T521, the still image photographing start button is pressed, and the pressed state of the button continues thereafter. At a time T530, the CPU 110 determines in the step S325 whether or not to continue the photographing. The answer to the question of the step S325 is affirmative (YES), so that the process returns to the step S320.

At the time T530, the CPU 110 determines again in the step S320 whether or not the still image photographing start button is in the pressed state at the start of the present frame. Since the still image photographing start button is in the pressed state at the start of a frame 2, the answer to the question of the step S320 is affirmative (YES), so that the process proceeds to the step S321. Also at the time T530, it is determined in the step S321 whether or not the next frame is the first frame from the frame (during which this determination is performed) immediately after detection of pressing the still image photographing start button. Since a frame 3 is the first frame from the frame immediately after detection of pressing the still image photographing start button, the answer to the question of the step S321 is affirmative (YES), so that the process proceeds to the step S360. Also at the time T530, the CPU 110 makes settings of the still image in the step S360. More specifically, the CPU 110 makes settings of the image sensor 107 for reading out image data of the still image, and makes settings of the DSP 108 for developing the image data of the still image.

Further, the CPU 110 makes settings of the timing pulse generation circuit 111 for the image capturing system vertical synchronization signal and the display system vertical synchronization signal, and makes settings of the display section 114 for displaying the image data of the still image. Further, the CPU 110 sets a timing for starting to read out the image data of the still image from the RAM 109. To output the image data of the still image subjected to the resolution conversion, from the data A output section 222, the CPU 110 sets the selector 221 of the image sensor 107 to the input "b". The timing for starting to read out the image data of the still image from the RAM 109 is set to a time point at which the predetermined time period tL=tS+tD (corresponding to a time period from a time T532 to a time T534) elapses after the frame start time. The time period tD represents a latency required to perform resolution conversion in which the resolution of the image data of the still image is converted to the resolution corresponding to the moving image size.

At the time T532, the CPU 110 starts issuing the image capturing system vertical synchronization signal and starts readout of the image data of the still image in the step S361. At a time T533, the resolution conversion in the step S362 starts to be performed to convert the resolution of the image data of the still image to the resolution corresponding to the moving image size. Then, development of the image data of the still image in the step S363 is started, and writing of the image data of the still image (resolution converted still image 3) in the RAM 109 in the step S364 is started. Also at the time T533, waiting for the lapse of the predetermined time period tL=tS+tD from the frame start time in the step S365 is started. At the time T534, the CPU 110 starts issuing the display system vertical synchronization signal and starts readout of the image data of the still image (resolution converted still image 3) from the RAM 109 in the step S366. Also at the time T534, update of display on the display section 114 based on the image data of the still image (resolution converted still image 3) in the step S367 is started. At a time T540, the CPU 110 determines in the step S325 whether or not to continue the photographing. The answer to the question of the step S325 is affirmative (YES), so that the process returns to the step S320.

At the time T540, the CPU 110 determines again in the step S320 whether or not the still image photographing start button is in the pressed state at the start of the present frame. Since the still image photographing start button is in the pressed state at the start of the frame 3, the answer to the question of the step S320 is affirmative (YES), so that the process proceeds to the step S321. Also at the time T540, it is determined in the step S321 whether or not the next frame is the first frame from the frame (during which this determination is performed) immediately after detection of pressing the still image photographing start button. Since a frame 4 is the second frame from the frame immediately after detection of pressing the still image photographing start button, the answer to the question of the step S321 is negative (NO), so that the process proceeds to the step S340. Also at the time T540, it is determined in the step S323 whether or not the next frame is an N-th frame after the last still image photographing. In the present embodiment, since N=3 holds and the frame 4 is the first frame from the last still image photographing, the answer to the question of the step S323 is negative (NO), so that the process proceeds to the step S340.

After that, at a time T544, update of display on the display section 114 based on the image data of the moving image in the step S347 is started. The steps S340 to S347 executed from the time T540 to the time T544 are the same as the steps S340 to S347 executed from the time T510 to the time T512. At a time T550, the CPU 110 determines in the step S325 whether or not to continue the photographing. The answer to the question of the step S325 is affirmative (YES), so that the process returns to the step S320.

At the time T550, the CPU 110 determines again in the step S320 whether or not the still image photographing start button is in the pressed state at the start of the present frame. Since the still image photographing start button is in the pressed state at the start of the frame 4, the answer to the question of the step S320 is affirmative (YES), so that the process proceeds to the step S321. Also at the time T550, it is determined in the step S321 whether or not the next frame is the first frame from the frame (during which this determination is performed) immediately after detection of pressing the still image photographing start button. Since a frame 5 is the third frame from the frame immediately after detection of pressing the still image photographing start button, the answer to the question of the step S321 is negative (NO), so that the process proceeds to the step S323. Also at the time T550, it is determined in the step S323 whether or not the next frame is the N-th frame after the last still image photographing. In the present embodiment, since N=3 holds and the frame 5 is the second frame from the last still image photographing, the answer to the question of the step S323 is negative (NO), so that the process proceeds to the step S340.

After that, at a time T554, update of display on the display section 114 based on the image data of the moving image in the step S347 is started. The steps S340 to S347 executed from the time T550 to the time T554 are the same as the steps S340 to S347 executed from the time T510 to the time T514. At a time T560, the CPU 110 determines in the step S325 whether or not to continue the photographing. The answer to the question of the step S325 is affirmative (YES), so that the process returns to the step S320.

At the time T560, the CPU 110 determines again in the step S320 whether or not the still image photographing start button is in the pressed state at the start of the present frame. Since the still image photographing start button is in the pressed state at the start of the frame 5, the answer to the question of the step S320 is affirmative (YES), so that the process proceeds to the step S321. Also at the time T560, it is determined in the step S321 whether or not the next frame is the first frame from the frame (during which this determination is performed) immediately after detection of pressing the still image photographing start button. Since a frame 6 is the fourth frame from the frame immediately after detection of pressing the still image photographing start button, the answer to the question of the step S321 is negative (NO), so that the process proceeds to the step S323. Also at the time T560, it is determined in the step S323 whether or not the next frame is the N-th frame after the last still image photographing. In the present embodiment, since N=3 holds and the frame 6 is the third frame from the last still image photographing, the answer to the question of the step S323 is affirmative (YES), so that the process proceeds to the step S360.

After that, at a time T564, update of display on the display section 114 based on the image data of the still image (resolution converted still image 6) in the step S367 is started. The steps S360 to S367 executed from the time T560 to the time T564 are the same as the steps S360 to S367 executed from the time T530 to the time T534. At a time T570, the CPU 110 determines in the step S325 whether or not to continue the photographing. The answer to the question of the step S325 is affirmative (YES), so that the process returns to the step S320. Further, the steps S340 to S347 executed from the time T570 to a time T584 are the same as the steps S340 to S347 executed from the time T540 to the time T554.

According to the present embodiment, as shown in FIG. 5, if the interval of the image capturing system vertical synchronization signal is the time period tA, the interval of the display system vertical synchronization signal before the start of the still image photographing is the time period tA, and the interval of the display system vertical synchronization signal during the still image photographing is also the time period tA. As a result, it is possible to keep constant the update interval of the display section 114. Although in the present embodiment, the description has been given of the control of a moving image before and after the pressing operation of the still image photographing start button and a still image, the present embodiment is not limited to this. For example, the processes in the present embodiment can be applied to a ranging operation by half-pressing the still image photographing start button for controlling a "first moving image (LV image)" before the half-pressing operation and a "second moving image (image for ranging)" during the half-pressing operation.

According to the present embodiment, the image capturing apparatus 1 can be configured such that start of readout of image data of a still image (image data with a second resolution) is instructed by an operation of the operation section 116 for starting the still image photographing. Further, the image capturing apparatus 1 can also be configured such that the start of readout of image data of a moving image for ranging is instructed by an operation of the operation section 116 for starting ranging operation.

Next, a second embodiment of the present invention will be described. In the first embodiment, since the update interval of the display section 114 is kept constant before and during still image photographing, it is difficult for the user to recognize that still image photographing is started. In the second embodiment, a description will be given of an example which makes it easy for the user to recognize that still image photographing is started, by displaying a substitute image for a still image e.g. in the first frame of the still image photographing on the display section 114. The substitute image is formed by reducing the luminance of the image data of the still image.

The second embodiment has the same hardware configurations as those of the first embodiment described with reference to FIG. 1 and FIGS. 2A and 2B. Determination of whether or not to display a substitute image in the first frame of the still image photographing may be performed e.g. by referring to a value set by the user via an associated menu. Operation performed in a case where a substitute image is not displayed in the first frame of the still image photographing is the same as in the first embodiment.

Figure 6:
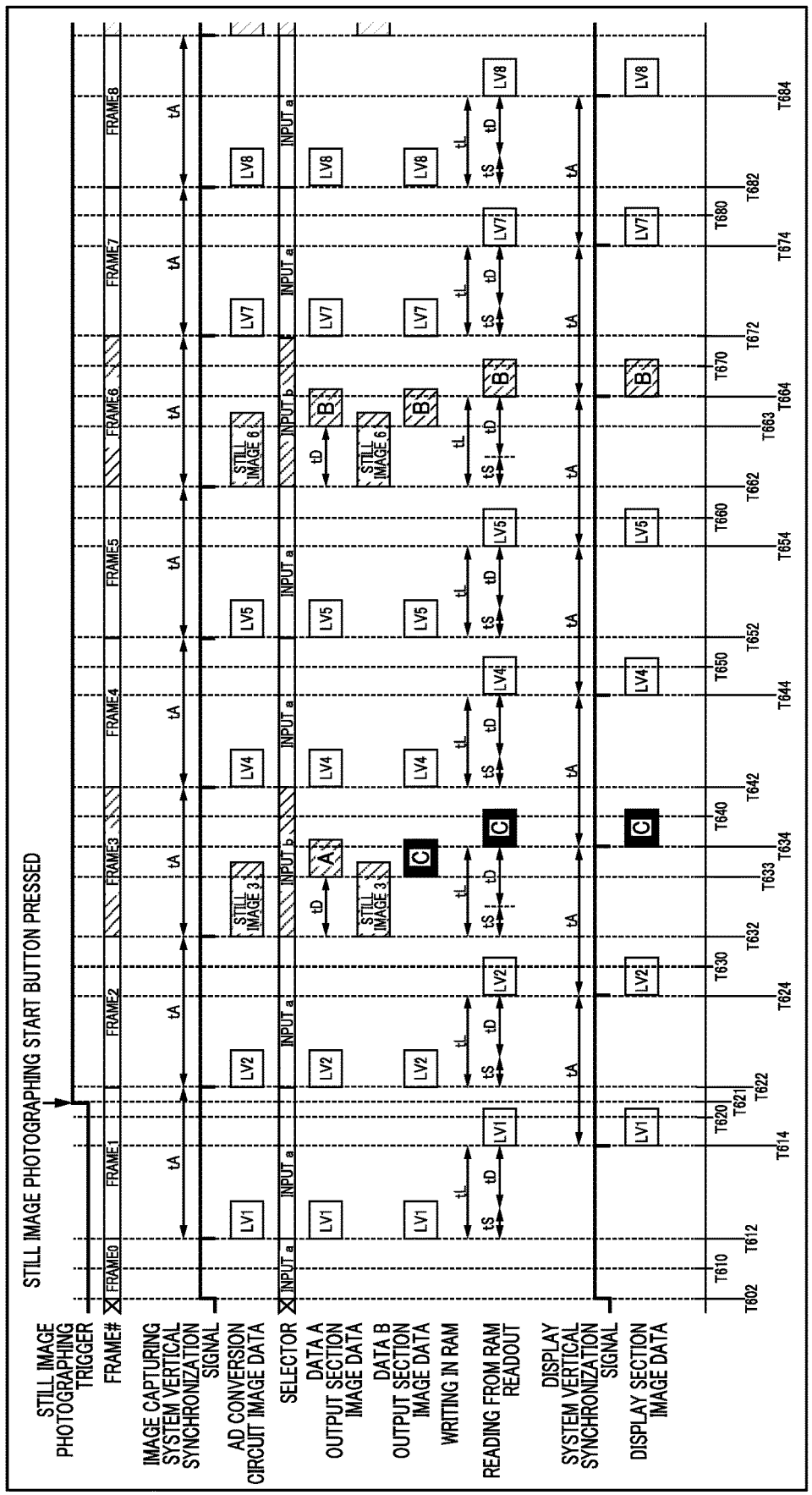
FIG. 6 is a view useful in explaining the timing of an image capturing operation of an image capturing apparatus according to a second embodiment.

FIG. 6 is a view useful in explaining the timing of an image capturing operation of an image capturing apparatus 1A according to the second embodiment. A process performed in the present embodiment, in which a substitute image in the first frame of still image photographing is displayed, will be described with reference to FIGS. 3 and 6. The process shown in FIG. 3 is realized by the CPU 110 that executes the associated program stored in the ROM 117.

At a time T602, photographing is started in the step S300. Although this photographing may be started immediately after power-on of the image capturing apparatus 1, this is not limitative. Here, the steps S340 to S347 executed from a time T610 to a time T624 are the same as the steps S340 to S347 executed from the time T510 to the time T524 in the first embodiment. At a time T630, the CPU 110 determines in the step S325 whether or not to continue the photographing. The answer to the question of the step S325 is affirmative (YES), so that the process proceeds to the step S320. At the time T630, the CPU 110 determines in the step S320 whether or not the still image photographing start button is in the pressed state at a predetermined timing. In the present embodiment, it is determined whether or not the still image photographing start button is in the pressed state at the start of each frame. At the start of a frame 2, since the still image photographing start button is in the pressed state, the answer to the question of the step S320 is affirmative (YES), so that the process proceeds to the step S321.

Also at the time T630, it is determined in the step S321 whether or not the next frame is the first frame from the frame (during which this determination is performed) immediately after detection of pressing the still image photographing start button. Since a frame 3 is the first frame from the frame immediately after detection of pressing the still image photographing start button, the answer to the question of the step S321 is affirmative (YES), so that the process proceeds to the step S360. Also at the time T630, the CPU 110 makes settings of the still image in the step S360. More specifically, the CPU 110 makes settings of the image sensor 107 for reading out image data of the still image, and makes settings of the DSP 108 for developing the image data of the still image. Further, the CPU 110 makes settings of the timing pulse generation circuit 111 for the image capturing system vertical synchronization signal and the display system vertical synchronization signal, and makes settings of the display section 114 for displaying the image data of the still image.

Further, the CPU 110 sets a timing for starting to read out the image data of the still image from the RAM 109. To output the image data of the still image subjected to the resolution conversion from the data A output section 222, the CPU 110 sets the selector 221 of the image sensor 107 to the input "b". The timing for starting to read out the image data of the still image from the RAM 109 is set to a time point at which the predetermined time period tL=tS+tD (corresponding to a time period from a time T632 to a time T634) elapses after the frame start time. The time period tD represents a latency required to perform resolution conversion in which the resolution of the image data of the still image is converted to the resolution corresponding to the moving image size. Further, only in the case of this frame, when the image data of the still image whose resolution has been converted to the moving image size is developed, processing for reducing the luminance of the image data is additionally performed, whereby the substitute image data is developed as the image data of the still image.

At the time T632, the CPU 110 starts issuing the image capturing system vertical synchronization signal and starts readout of the image data of the still image in the step S361 is started. At a time T633, the resolution conversion in the step S362 starts to be performed to convert the resolution of the image data of the still image to the resolution corresponding to the moving image size. At the time T633, in the step S363, when the image data of the still image is developed, substitute image data is developed as the image data of the still image. At the time T633, after writing the image data of the still image (substitute still image 3) in the RAM 109 is started, waiting for the lapse of the predetermined time period tL=tS+tD from the frame start time in the step S365 is started.

At the time T634, the CPU 110 starts issuing the display system vertical synchronization signal and starts readout of the image data of the still image (substitute still image 3) from the RAM 109 in the step S366. Also at the time T634, update of display on the display section 114 based on the image data of the still image (substitute still image 3) in the step S367 is started. At a time T640, the CPU 110 determines in the step S325 whether or not to continue the photographing. The answer to the question of the step S325 is affirmative (YES), so that the process returns to the step S320. Here, the steps S340 to S347 executed from the time T640 to a time T654 are the same as the steps S340 to S347 executed from the time T540 to the time T554 in the first embodiment.

At a time T660, the CPU 110 determines again in the step S320 whether or not the still image photographing start button is in the pressed state at the start of the present frame. Since the still image photographing start button is in the pressed state at the start of a frame 5, the answer to the question of the step S320 is affirmative (YES), so that the process proceeds to the step S321. Also at the time T660, it is determined in the step S321 whether or not the next frame is the first frame from the frame (during which this determination is performed) immediately after detection of pressing the still image photographing start button. Since a frame 6 is the fourth frame from the frame immediately after detection of pressing the still image photographing start button, the answer to the question of the step S321 is negative (NO), so that the process proceeds to the step S323. Also at the time T660, it is determined in the step S323 whether or not the next frame is the N-th frame after the last still image photographing. In the present embodiment, since N=3 holds and the frame 6 is the third frame from the last still image photographing, the answer to the question of the step S323 is affirmative (YES), so that the process proceeds to the step S360.

After that, at a time T664, update of display on the display section 114 based on the image data of the still image (resolution converted still image 6) in the step S367 is started. The steps S360 to S367 executed from the time T660 to the time T664 are the same as the steps S360 to S367 executed from the time T630 to the time T634 except for the step for generating the substitute image data from the image data of the still image. At a time T670, the CPU 110 determines in the step S325 whether or not to continue the photographing. The answer to the question of the step S325 is affirmative (YES), so that the process returns to the step S320. The steps S340 to S347 executed from the time T670 to a time T684 are the same as the steps S340 to S347 executed from the time T570 to the time T584 in the first embodiment.

According to the present embodiment, as shown in FIG. 6, assuming that the interval of the image capturing system vertical synchronization signal is the time period tA, the interval of the display system vertical synchronization signal before the start of the still image photographing is the time period tA, and the interval of the display system vertical synchronization signal during the still image photographing is also the time period tA. As a result, it is possible to keep constant the update interval of the display section 114. Further, the substitute image is displayed in the first frame of the still image photographing, which can make it easy for the user to recognize that the still image photographing is started.

Further, although in the present embodiment, the first frame of the still image photographing performed after the pressing operation of the still image photographing start button is replaced by the substitute image, a frame other than the first frame of the still image photographing performed after the pressing operation of the still image photographing start button may be replaced by the substitute image. Furthermore, any frame of the moving image photographing performed after the pressing operation of the still image photographing start button may be replaced by the substitute image. Further, although the substitute image with reduced luminance is displayed, by way of example, the first frame may be replaced by a fixed pattern image, such as a black image unrelated to the image data of the frame.

In the present embodiment, substitute image data can be displayed on the display section 114, in a predetermined frame after a timing of instruction given by the operation section 116. Further, as the substitute image data, it is possible to use not only the image data formed by changing the luminance of image data in the predetermined frame but also image data unrelated to the image data in the predetermined frame.

Next, a third embodiment of the present invention will be described. In the first embodiment, there is a case where in moving image photographing before still image photographing, a time delay before image data is displayed on the display section 114 increases, which causes inconvenience when the still image photographing following a fast-moving object is started. In the third embodiment, a description is given of an example in which, in the moving image photographing before the still image photographing, a display update interval is kept constant while suppressing a time delay before image data is displayed on the display section 114 by placing importance on followability to the object. Note that the third embodiment has the same hardware configurations as those of the first embodiment described with reference to FIG. 1 and FIGS. 2A and 2B.

Determination of whether or not to suppress the time delay before image data is displayed on the display section 114 in the moving image photographing before the still image photographing may be performed e.g. by referring to a value set by the user via an associated menu. Operation performed in the present embodiment in a case where the time delay before display of image data on the display section 114 in the moving image photographing before the still image photographing is allowed is the same as performed in the first embodiment.

Figure 7:
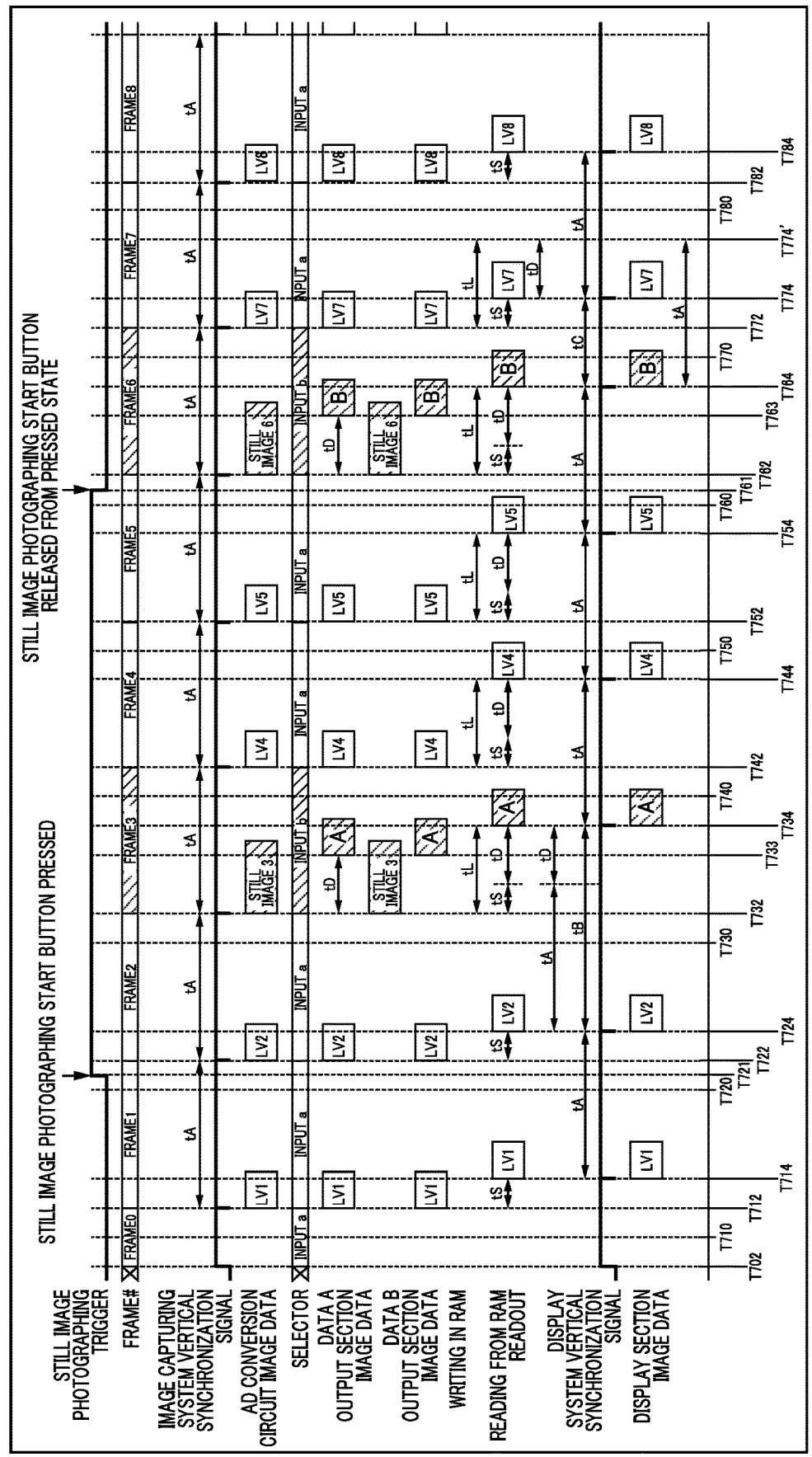
FIG. 7 is a view useful in explaining the timing of an image capturing operation of an image capturing apparatus according to a third embodiment.

FIG. 7 is a view useful in explaining the timing of an image capturing operation of an image capturing apparatus 1B according to the third embodiment. A process for suppressing the time delay before image data is displayed on the display section 114 in the moving image photographing before the still image photographing will be described with reference to FIGS. 3 and 7. The process shown in FIG. 3 is realized by the CPU 110 that executes the associated program stored in the ROM 117.

At a time T702, photographing is started in the step S300. Although this photographing may be started immediately after power-on of the image capturing apparatus 1, this is not limitative. At a time T710, it is determined in the step S320 whether or not the still image photographing start button is in a pressed state at a predetermined timing. In the present embodiment, it is determined whether or not the still image photographing start button is in the pressed state at the start of each frame. It is determined that the still image photographing start button is not in the pressed state at the start of a frame 0 (at the photographing start time at the time T702), and hence the answer to the question of the step S320 is negative (NO), so that the process proceeds to the step S340. Also at the time T710, the CPU 110 makes settings of a moving image in the step S340. More specifically, the CPU 110 makes settings of the image sensor 107 for reading out image data of the moving image and makes settings of the DSP 108 for developing the image data of the moving image.

Further, the CPU 110 makes settings of the timing pulse generation circuit 111 for the image capturing system vertical synchronization signal and the display system vertical synchronization signal, and makes settings of the display section 114 for displaying the image data of the moving image. Further, the CPU 110 sets a timing for starting to read out the image data of the moving image from the RAM 109. To output the image data of the moving image from the data A output section 222, the CPU 110 sets the selector 221 of the image sensor 107 to the input "a". The timing for starting to read out the image data of the moving image from the RAM 109 is set to a time point at which the predetermined time period tS (corresponding to a time period from a time T712 to a time T714) elapses after the frame start time.

At the time T712, the CPU 110 starts issuing the image capturing system vertical synchronization signal and starts readout of the image data of the moving image in the step S341. Also at the time T712, development of the image data of the moving image in the step S343 is started, and writing of the image data of the moving image in the RAM 109 in the step S344 is started. Also at the time T712, waiting for the lapse of the predetermined time period tS in the step S345 is started. At the time T714, the CPU 110 starts issuing the display system vertical synchronization signal and starts readout of the image data of the moving image from the RAM 109 in the step S346. Also at the time T714, update of display on the display section 114 based on the image data of the moving image in the step S347 is started. At a time T720, it is determined in the step S325 whether or not to continue the photographing. If the photographing is to be continued (YES to the step S325), the process returns to the step S320.

On the other hand, if the photographing is not to be continued (NO to the step S325), the photographing is terminated in the step S301. For example, if a menu is displayed on the display section 114 or if the power switch is turned off, it is determined that the photographing is not to be continued, so that the photographing is terminated.

If it is determined in the step S325 that the photographing is to be continued (YES to the step S325), at the time T720, the CPU 110 determines again in the step S320 whether or not the still image photographing start button is in the pressed state at the start of the present frame. Since it is determined that the still image photographing start button is not in the pressed state at the start of the frame 1, the answer to the question of the step S320 is negative (NO), so that the process proceeds to the step S340. After that, at a time T724, update of display on the display section 114 based on the image data of the moving image in the step S347 is started. The steps S340 to S347 executed from the time T720 to the time T724 are the same as the steps S340 to S347 executed from the time T710 to the time T714. However, it is assumed in the illustrated example that at a time T721, the still image photographing start button is pressed, and the pressed state of the button continues thereafter until a time T761. At a time T730, the CPU 110 determines in the step S325 whether or not to continue the photographing. The answer to the question of the step S325 is affirmative (YES), so that the process returns to the step S320.

At the time T730, the CPU 110 determines again in the step S320 whether or not the still image photographing start button is in the pressed state at the start of the present frame. Since it is determined that the still image photographing start button is in the pressed state at the start of a frame 2, the answer to the question of the step S320 is affirmative (YES), so that the process proceeds to the step S321. Also at the time T730, it is determined in the step S321 whether or not the next frame is the first frame from the frame (during which this determination is performed) immediately after detection of pressing the still image photographing start button. Since a frame 3 is the first frame from the frame immediately after detection of pressing the still image photographing start button, the answer to the question of the step S321 is affirmative (YES), so that the process proceeds to the step S360. Also at the time T730, the CPU 110 makes settings of the still image in the step S360. More specifically, the CPU 110 makes settings of the image sensor 107 for reading out image data of the still image, and makes settings of the DSP 108 for developing the image data of the still image.

Further, the CPU 110 makes settings of the timing pulse generation circuit 111 for the image capturing system vertical synchronization signal and the display system vertical synchronization signal, and makes settings of the display section 114 for displaying the image data of the still image. Further, the CPU 110 sets a timing for starting to read out the image data of the still image from the RAM 109. To output the image data of the still image subjected to the resolution conversion from the data A output section 222, the CPU 110 sets the selector 221 of the image sensor 107 to the input "b". The timing for starting to read out the image data of the still image from the RAM 109 is set to a time point at which the predetermined time period tL=tS+tD (corresponding to a time period from a time T732 to a time T734) elapses after the frame start time. The time period tD represents a latency required to perform resolution conversion in which the resolution of the image data of the still image is converted to the resolution corresponding to the moving image size.

At the time T732, the CPU 110 starts issuing the image capturing system vertical synchronization signal and starts readout of the image data of the still image in the step S361. At a time T733, the resolution conversion starts to be performed to convert the resolution of the image data of the still image to the resolution corresponding to the moving image size, and development of the image data of the still image is started. Further, writing of the image data of the still image (resolution converted still image 3) in the RAM 109 in the step S364 is started and then waiting for the lapse of the predetermined time period tL=tS+tD from the frame start time in the step S365 is started. At the time T734, the CPU 110 starts issuing the display system vertical synchronization signal and starts readout of the image data of the still image from the RAM 109 in the step S366. Also at the time T734, update of display on the display section 114 based on the image data of the still image (resolution converted still image 3) in the step S367 is started. At a time T740, the CPU 110 determines in the step S325 whether or not to continue the photographing. The answer to the question of the step S325 is affirmative (YES), so that the process returns to the step S320.

At the time T740, the CPU 110 determines again in the step S320 whether or not the still image photographing start button is in the pressed state at the start of the present frame. Since it is determined that the still image photographing start button is in the pressed state at the start of the frame 3, the answer to the question of the step S320 is affirmative (YES), so that the process proceeds to the step S321. Also at the time T740, it is determined in the step S321 whether or not the next frame is the first frame from the frame (during which this determination is performed) immediately after detection of pressing the still image photographing start button. Since a frame 4 is the second frame from the frame immediately after detection of pressing the still image photographing start button, the answer to the question of the step S321 is negative (NO), so that the process proceeds to the step S323. Also at the time T740, it is determined in the step S323 whether or not the next frame is the N-th frame after the last still image photographing. In the present embodiment, since N=3 holds and the frame 4 is the first frame from the last still image photographing, the answer to the question of the step S323 is negative (NO), so that the process proceeds to the step S340.

After that, at a time T744, update of display on the display section 114 based on the image data of the moving image in the step S347 is started. Processing in the steps S340 to S347 executed from the time T740 to the time T744 has been changed from processing in the steps S340 to S347 executed from the time T710 to the time T714, in the timing for starting to read out the image data of the moving image. More specifically, in the processing in the steps S340 to S347 executed from the time T740 to the time T744, the timing for starting to read out the image data of the moving image is set to the predetermined time period tL=tS+tD after the frame start time. At a time T750, the CPU 110 determines in the step S325 whether or not to continue the photographing. The answer to the question of the step S325 is affirmative (YES), so that the process returns to the step S320.

At the time T750, the CPU 110 determines again in the step S320 whether or not the still image photographing start button is in the pressed state at the start of the present frame. It is determined that the still image photographing start button is in the pressed state at the start of the frame 4, and hence the answer to the question of the step S320 is affirmative (YES), so that the process proceeds to the step S321. Also at the time T750, it is determined in the step S321 whether or not the next frame is the first frame from the frame (during which this determination is performed) immediately after detection of pressing the still image photographing start button. Since a frame 5 is the third frame from the frame immediately after detection of pressing the still image photographing start button, the answer to the question of the step S321 is negative (NO), so that the process proceeds to the step S323. Also at the time T750, it is determined in the step S323 whether or not the next frame is the N-th frame after the last still image photographing. In the present embodiment, since N=3 holds and the frame 5 is the second frame from the last still image photographing, the answer to the question of the step S323 is negative (NO), so that the process proceeds to the step S340.

After that, at a time T754, update of display on the display section 114 based on the image data of the moving image in the step S347 is started. Processing in the steps S340 to S347 executed from the time T750 to the time T754 has been changed from the processing in the steps S340 to S347 executed from the time T710 to the time T714, in the timing for starting to read out the image data of the moving image. More specifically, in the processing in the steps S340 to S347 executed from the time T750 to the time T754, the timing for starting to read out the image data of the moving image is set to the predetermined time period tL=tS+tD after the frame start time. At a time T760, the CPU 110 determines in the step S325 whether or not to continue the photographing. The answer to the question of the step S325 is affirmative (YES), so that the process returns to the step S320.

At the time T760, the CPU 110 determines again in the step S320 whether or not the still image photographing start button is in the pressed state at the start of the present frame. It is determined in the step S320 that the still image photographing start button is in the pressed state at the start of the frame 5, and hence the answer to the question of the step S320 is affirmative (YES), so that the process proceeds to the step S321. Also at the time T760, it is determined in the step S321 whether or not the next frame is the first frame from the frame (during which this determination is performed) immediately after detection of pressing the still image photographing start button. Since a frame 6 is the fourth frame from the frame immediately after detection of pressing the still image photographing start button, the answer to the question of the step S321 is negative (NO), so that the process proceeds to the step S340. Also at the time T760, it is determined in the step S323 whether or not the next frame is the N-th frame after the last still image photographing. In the present embodiment, since N=3 holds and the frame 6 is the third frame from the last still image photographing, the answer to the question of the step S323 is affirmative (YES), so that the process proceeds to the step S360.

After that, at a time T764, in the step S347, update of display on the display section 114 based on the image data of the still image (resolution converted still image 6) is started. The steps S360 to S367 executed from the time T760 to the time T764 are the same as the steps S360 to S367 executed from the time T730 to the time T734. However, it is assumed in the illustrated example that the pressing of the still image photographing start button is cancelled at the time T761, and the pressing cancelled state continues thereafter. At a time T770, the CPU 110 determines in the step S325 whether or not to continue the photographing. The answer to the question of the step S325 is affirmative (YES), so that the process returns to the step S320.

At the time T770, the CPU 110 determines again in the step S320 whether or not the still image photographing start button is in the pressed state at the start of the present frame. Since it is determined that the still image photographing start button is not in the pressed state at the start of the frame 6, the answer to the question of the step S320 is negative (NO), so that the process returns to the step 340. After that, at a time T774, update of display on the display section 114 based on the image data of the moving image in the step S347 is started. The steps S340 to S347 executed from the time T770 to the time T774 are the same as the steps S340 to S347 executed from the time T710 to the time T714. If the timing for starting to read out the image data of the moving image from the RAM 109 is set to a time point at which the predetermined time period tL=tS+tD (corresponding to the time period from the time T772 to a time T774') elapses after the frame start time, the interval of the display system vertical synchronization signal for the frame 6 is the time period tA. Here, however, since the timing for starting to read out the image data of the moving image from the RAM 109 is set to a time point at which the time period tS (corresponding to the time period from the time T712 to the time T714) elapses after the frame start time, the interval of the display system vertical synchronization signal for the frame 6 is the time period tC=tA-tD.

At a time T780, the CPU 110 determines in the step S325 whether or not to continue the photographing. The answer to the question of the step S325 is affirmative (YES), so that the process returns to the step S320. At the time T780, the CPU 110 determines again in the step S320 whether or not the still image photographing start button is in the pressed state at the start of the present frame. Since it is determined that the still image photographing start button is not in the pressed state at the start of a frame 7, the answer to the question of the step S320 is negative (NO), so that the process proceeds to the step S340. After that, at a time T784, update of display on the display section 114 based on the image data of the moving image in the step S347 is started. The steps S340 to S347 executed from the time T780 to the time T784 are the same as the steps S340 to S347 executed from the time T710 to the time T714.

According to the present embodiment, as shown in FIG. 7, if the interval of the image capturing system vertical synchronization signal is the time period tA, the interval of the display system vertical synchronization signal immediately before the start of the still image photographing is the time period tB=tA+tD. Further, when the image capturing apparatus 1 returns to the moving image photographing after the still image photographing start has been released from the pressed state, the interval of the display system vertical synchronization signal is the time period tC=tA−tD. However, the interval of the display system vertical synchronization signal in the other cases is the time period tA, whereby it is possible to keep constant the update interval of the display section 114 except immediately before the start of the still image photographing and when the image capturing apparatus 1 returns to the moving image photographing after the still image photographing start has been released from the pressed state. Further, since the time delay before display of image data on the display section 114 is suppressed in the moving image photographing before the still image photographing, it is also advantageous in that followability to a fast-moving object is not spoiled in the moving image photographing before the still image photographing.

Next, a fourth embodiment of the present invention will be described. In the third embodiment, there is a case where in the moving image photographing during the still image photographing, a time delay before image data is displayed on the display section 114 increases, causing inconvenience when a fast-moving object is followed also during the still image photographing. In the fourth embodiment, a description is given of an example in which, in the moving image photographing before and during the still image photographing, the display update interval is kept constant while suppressing a time delay before image data is displayed on the display section 114 by placing importance on followability to the object. Note that the fourth embodiment has the same configuration as that of the first embodiment, as shown in FIG. 1 and FIGS. 2A and 2B.

Whether or not to suppress the time delay before image data is displayed on the display section 114 in the moving image photographing before and during the still image photographing may be determined e.g. by referring to a value set by the user via an associated menu. Operation performed in the present embodiment in a case where the time delay before image data is displayed on the display section 114 in the moving image photographing before and during the still image photographing is allowed is the same as performed in the first embodiment. Further, operation performed in the present embodiment in a case where the time delay before display of the image data on the display section 114 is allowed only in the moving image photographing during the still image photographing is the same as performed in the third embodiment.

Figure 8:
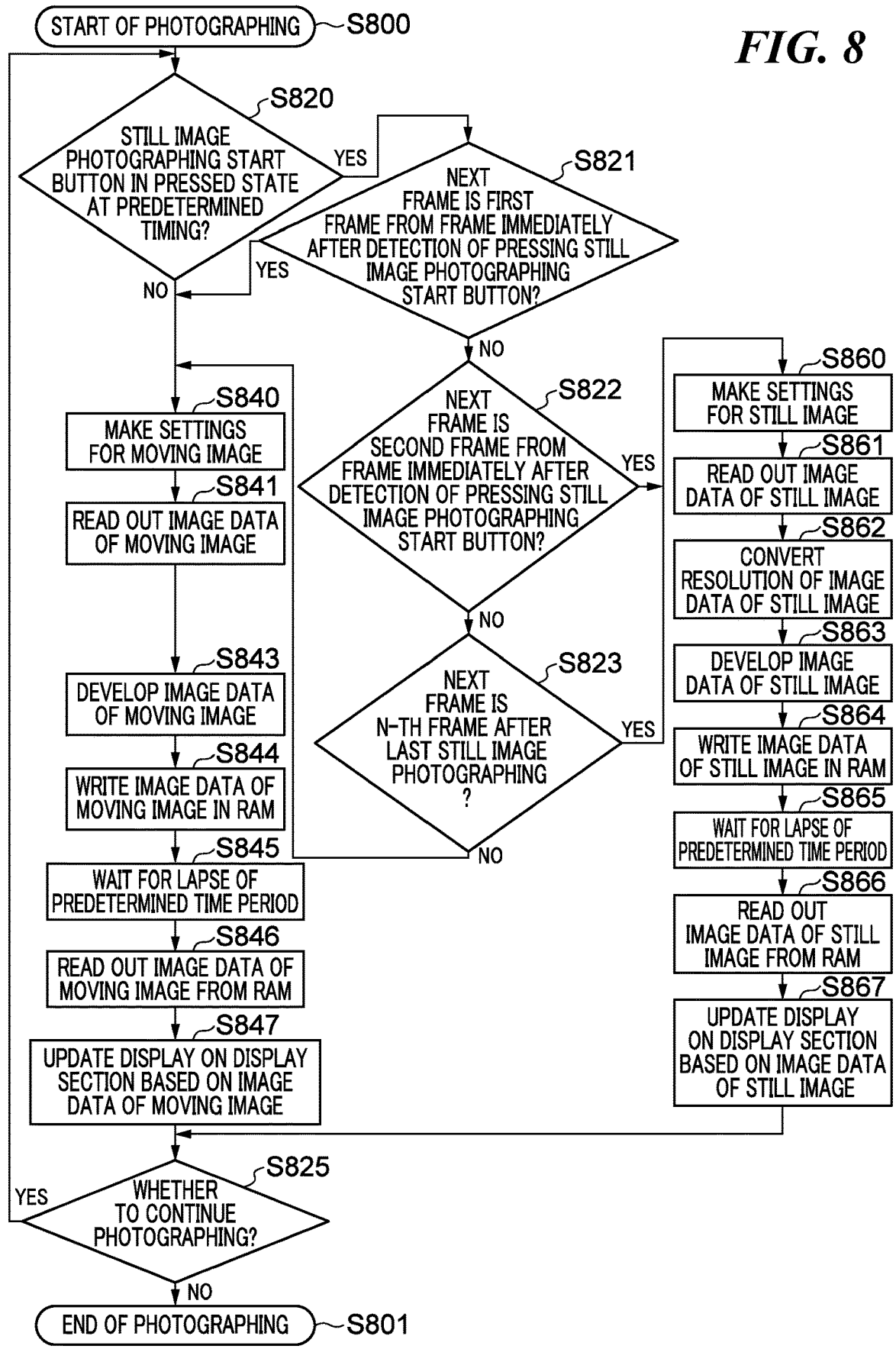
FIG. 8 is a flowchart of an image capturing process performed by an image capturing apparatus according to a fourth embodiment.
Figure 9:
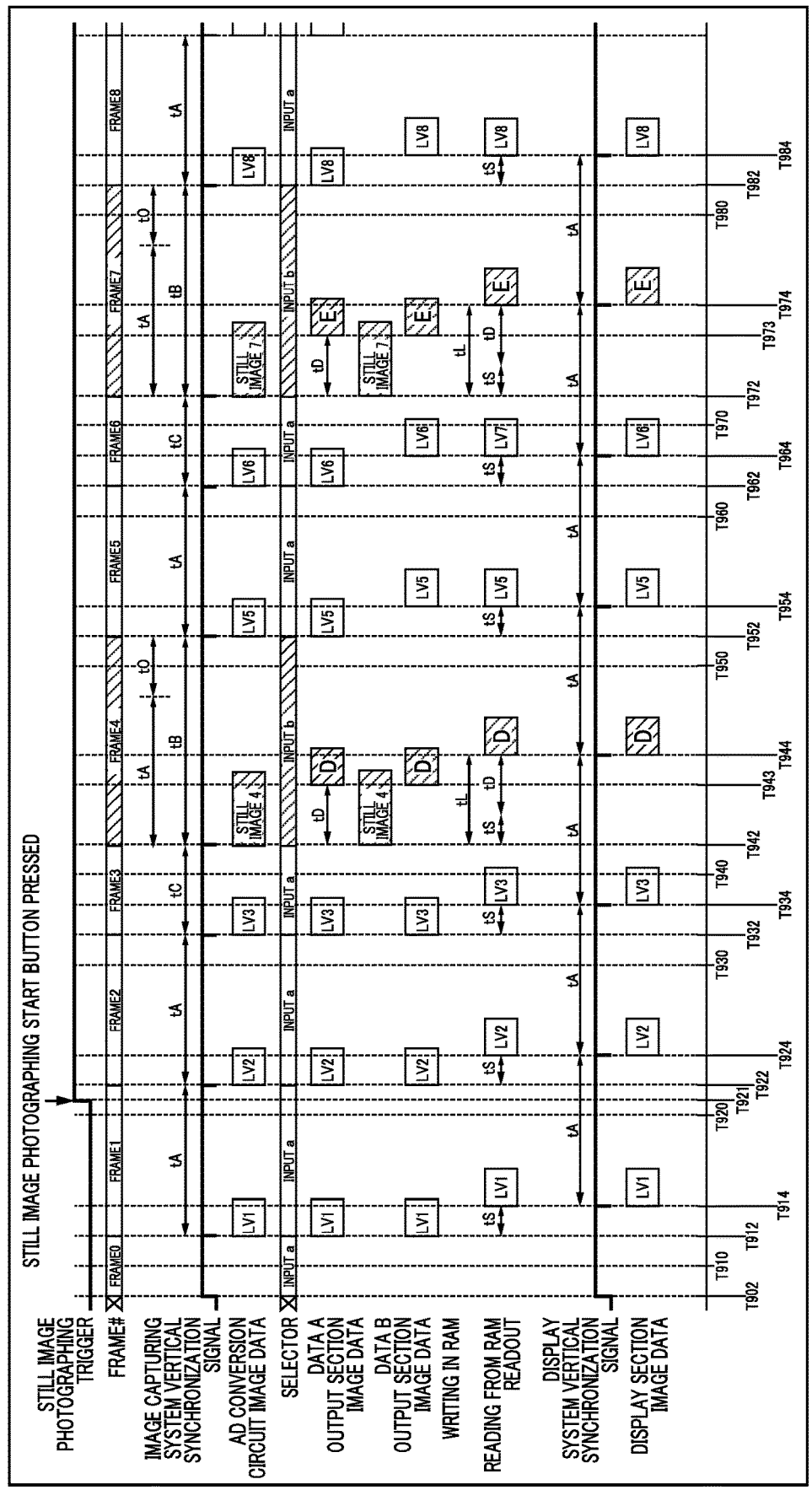
FIG. 9 is a view useful in explaining the timing of an image capturing operation of the image capturing apparatus according to the fourth embodiment.

FIG. 8 is a flowchart of an image capturing process performed by an image capturing apparatus 1C according to the fourth embodiment. FIG. 9 is a view useful in explaining the timing of the image capturing operation of the image capturing apparatus 1C according to the fourth embodiment. A process for suppressing the time delay before image data is displayed on the display section 114 in the moving image photographing before and during the still image photographing will be described with reference to FIGS. 8 and 9. Note that the process shown in FIG. 8 is realized by the CPU 110 that executes an associated program stored in the ROM 117.

At a time T902, photographing is started in a step S800. Although this photographing may be started immediately after power-on of the image capturing apparatus 1, this is not limitative. At a time T910, it is determined in a step S820 whether or not the still image photographing start button is in the pressed state at a predetermined timing. In the present embodiment, it is determined whether or not the still image photographing start button is in the pressed state at the start of each frame. It is determined that the still image photographing start button is not in the pressed state at the start of a frame 0 (at the photographing start time at the time T902), and hence the answer to the question of the step S820 is negative (N), so that the process proceeds to a step S840. Also at the time T910, the CPU 110 makes settings of a moving image in the step S840. More specifically, the CPU 110 makes settings of the image sensor 107 for reading out image data of the moving image and makes settings of the DSP 108 for developing the image data of the moving image.

Further, the CPU 110 makes settings of the timing pulse generation circuit 111 for the image capturing system vertical synchronization signal and the display system vertical synchronization signal, and makes settings of the display section 114 for displaying the image data of the moving image. Further, the CPU 110 sets a timing for starting to read out the image data of the moving image from the RAM 109. To output the image data of the moving image from the data A output section 222, the CPU 110 sets the selector 221 of the image sensor 107 to the input "a". The timing for starting to read out the image data of the moving image from the RAM 109 is set to a time point at which the time period tS (corresponding to a time T912 to a time T914) elapses after the frame start time.

At the time T912, the CPU 110 starts issuing the image capturing system vertical synchronization signal and starts readout of the image data of the moving image in a step S841. Also at the time T912, development of the image data of the moving image in a step S843 is started and writing of the image data of the moving image in the RAM 109 in a step S844 is started. Also at the time T912, the CPU 110 starts waiting for the lapse of the predetermined time period tS in a step S845. At the time T914, the CPU 110 starts issuing the display system vertical synchronization signal and starts readout of the image data of the moving image from the RAM 109 in a step S846. Also at the time T914, update of display on the display section 114 based on the image data of the moving image in a step S847 is started. At a time T920, it is determined in a step S825 whether or not to continue the photographing. If the photographing is to be continued (YES to the step S825), the process returns to the step S820.

On the other hand, if the photographing is not to be continued (NO to the step S825), the CPU 110 terminates the photographing in a step S801. For example, if a menu is displayed on the display section 114 or if the power switch is turned off, it is determined that the photographing is not to be continued, so that the photographing is terminated.

If it is determined in the step S325 that the photographing is to be continued (YES to the step S825), at the time T920, the CPU 110 determines again in the step S820 whether or not the still image photographing start button is in the pressed state at the start of the present frame. Since it is determined that the still image photographing start button is not in the pressed state at the start of the frame 1, the answer to the question of the step S820 is negative (NO), so that the process proceeds to the step S840. After that, at a time T924, update of display on the display section 114 based on the image data of the moving image in the step S847 is started. The steps S840 to S847 executed from the time T920 to the time T924 are the same as the steps S840 to S847 executed from the time T910 to the time T914. However, it is assumed in the illustrated example that at a time T921, the still image photographing start button is pressed, and the pressed state of the button continues thereafter. At a time T930, the CPU 110 determines in the step S825 whether or not to continue the photographing. The answer to the question of the step S825 is affirmative (YES), so that the process proceeds to the step S820.

At the time T930, in the step S820, the CPU 110 determines again whether or not the still image photographing start button is in the pressed state at the start of the present frame. Since it is determined that the still image photographing start button is in the pressed state at the start of a frame 2, the answer to the question of the step S820 is affirmative (YES), so that the CPU 110 proceeds to a step S821. Also at the time T930, in the step S821, it is determined whether or not the next frame is the first frame from the frame (during which this determination is performed) immediately after detection of pressing the still image photographing start button. Since a frame 3 is the first frame from the frame immediately after detection of pressing the still image photographing start button, the answer to the question of the step S821 is affirmative (YES), so that the process proceeds to the step S840.

After that, at a time T924, update of display on the display section 114 based on the image data of the moving image in the step S847 is started. Processing in the steps S840 to S847 executed from the time T930 to a time T934 is different from in the steps S840 to S847 executed from the time T910 to the time T914 in that the interval of the image capturing system vertical synchronization signal for the frame 3 associated therewith is set to a time period tC=tA−tD. Here, the time period tA is the interval of the image capturing system vertical synchronization signal for a frame 1 and the frame 2. The time period tD represents a latency required to convert the resolution of the image data of the still image to the resolution corresponding the moving image size, and the amount of the latency is uniquely determined by the still image readout time and the image sizes of the still images before and after the conversion. Therefore, the time period tD can be calculated even during moving image photographing before still image photographing. At a time T940, the CPU 110 determines in the step S825 whether or not to continue the photographing. The answer to the question of the step S825 is affirmative (YES), so that the process proceeds to the step S820.

At the time T940, the CPU 110 determines in the step S820 whether or not the still image photographing start button is in the pressed state at the start of the present frame. Since it is determined that the still image photographing start button is in the pressed state at the start of the frame 3, the answer to the question of the step S820 is affirmative (YES), so that the process proceeds to the step S821. Also at the time T940, it is determined in the step S821 whether or not the next frame is the first frame from the frame (during which this determination is performed) immediately after detection of pressing the still image photographing start button. Since a frame 4 is the second frame from the frame immediately after detection of pressing the still image photographing start button, the answer to the question of the step S821 is negative (NO), so that the process proceeds to a step S822. Also at the time T940, it is determined in the step S822 whether or not the next frame is the second frame from the frame immediately after detection of pressing the still image photographing start button. Since the frame 4 is the second frame from the frame immediately after detection of pressing the still image photographing start button, the answer to the question of the step S822 is affirmative (YES), so that the CPU 110 proceeds to a step S860.

Also at the time T940, the CPU 110 makes settings of a still image in the step S860. More specifically, the CPU 110 makes settings of the image sensor 107 for reading out image data of the still image, and makes settings of the DSP 108 for developing the image data of the still image. Further, the CPU 110 makes settings of the timing pulse generation circuit 111 for the image capturing system vertical synchronization signal and the display system vertical synchronization signal, and makes settings of the display section 114 for displaying the image data of the still image. Further, the CPU 110 sets a timing for starting to read out the image data of the still image from the RAM 109. To output the image data of the still image subjected to the resolution conversion from the data A output section 222, the CPU 110 sets the selector 221 of the image sensor 107 to the input "b".

The timing for starting to read out the image data of the still image from the RAM 109 is set to a time point at which the predetermined time period tL=tS+tD (corresponding to a time period from a time T942 to a time T944) elapses after the frame start time. The time period tD represents the latency required to perform resolution conversion in which the resolution of the image data of the still image is converted to the resolution corresponding to the moving image size. When the moving image photographing is performed between the frames of the still image photographing, the interval of the image capturing system vertical synchronization signal is set to the time period tB=tA+tD, whereas when the moving image photographing is not performed between the frames of the still image photographing, the interval of the image capturing system vertical synchronization signal is set to the time period tA. In the present embodiment, the moving image photographing is performed between the frames of the still image photographing.

At the time T942, the CPU 110 starts issuing the image capturing system vertical synchronization signal and starts readout of the image data of the still image in a step S861. At a time T943, the resolution conversion in a step S862 starts to be performed to convert the resolution of the image data of the still image to the resolution corresponding to the moving image size, and development of the image data of the still image in a step S863 is started. Further, at the time T943, the CPU 110 starts writing of the image data of the still image (resolution converted still image 4) in the RAM 109 in a step S864, and then starts waiting for the lapse of the predetermined time period tL=tS+tD from the frame start time in a step S865. At the time T944, the CPU 110 starts issuing the display system vertical synchronization signal and starts readout of the image data of the still image from the RAM 109 in a step S866. Also at the time T944, update of display on the display section 114 based on the image data of the still image (resolution converted still image 4) in a step S867 is started. At a time T950, the CPU 110 determines in the step S825 whether or not to continue the photographing. The answer to the question of the step S825 is affirmative (YES), so that the process proceeds to the step S820.

At the time T950, the CPU 110 determines again in the step S820 whether or not the still image photographing start button is in the pressed state at the start of the present frame. It is determined that the still image photographing start button is in the pressed state at the start of the frame 4, and hence the answer to the question of the step S820 is affirmative (YES), so that the process proceeds to the step S821. Also at the time T950, it is determined in the step S821 whether or not the next frame is the first frame from the frame (during which this determination is performed) immediately after detection of pressing the still image photographing start button. Since a frame 5 is the third frame from the frame immediately after detection of pressing the still image photographing start button, the answer to the question of the step S821 is negative (NO), so that the process proceeds to the step S822.

Also at the time T950, in the step S822, it is determined whether or not the next frame is the second frame from the frame immediately after detection of pressing the still image photographing start button. Since the frame 5 is the third frame from the frame immediately after detection of pressing the still image photographing start button, the answer to the question of the step S822 is negative (NO), so that the process proceeds to a step S823. Also at the time T950, it is determined in the step S823 whether or not the next frame is the N-th frame after the last still image photographing. In the present embodiment, since N=3 holds and the frame 5 is the first frame from the last still image photographing, the answer to the question of the step S823 is negative (NO), so that the process proceeds to the step S840.

After that, at a time T954, update of display on the display section 114 based on the image data of the moving image in the step S847 is started. The steps S840 to S847 executed from the time T950 to the time T954 are the same as the steps S840 to S847 executed from the time T910 to the time T914. At a time T960, the CPU 110 determines in the step S825 whether or not to continue the photographing. The answer to the question of the step S825 is affirmative (YES), so that the process proceeds to the step S820.

At the time T960, the CPU 110 determines again in the step S820 whether or not the still image photographing start button is in the pressed state at the start of the present frame. It is determined in the step S320 that the still image photographing start button is in the pressed state at the start of the frame 5, and hence the answer to the question of the step S820 is affirmative (YES), so that the process proceeds to the step S821. Also at the time T960, it is determined in the step S821 whether or not the next frame is the first frame from the frame (during which this determination is performed) immediately after detection of pressing the still image photographing start button. Since a frame 6 is the fourth frame from the frame immediately after detection of pressing the still image photographing start button, the answer to the question of the step S821 is negative (NO), so that the process proceeds to the step S822.

Also at the time T960, it is determined in the step S822 whether or not the next frame is the second frame from the frame immediately after detection of pressing the still image photographing start button. Since the frame 6 is the fourth frame from the frame immediately after detection of pressing the still image photographing start button, the answer to the question of the step S822 is negative (NO), so that the process proceeds to the step S823. Also at the time T960, it is determined in the step S823 whether or not the next frame is the N-th frame after the last still image photographing. In the present embodiment, since N=3 holds and the frame 6 is the second frame from the last still image photographing, the answer to the question of the step S823 is negative (NO), so that the process proceeds to the step S840.

After that, at a time T964, update of display on the display section 114 based on the image data of the moving image in the step S847 is started. Processing in the steps S840 to S847 executed from the time T960 to the time T964 is different from the processing in the steps S840 to S847 executed from the time T910 to the time T914 in that the interval of the image capturing system vertical synchronization signal for the frame 6 associated therewith is set to the time period tC=tA-tD. At a time T970, it is determined in the step S825 whether or not to continue the photographing. The answer to the question of the step S825 is affirmative (YES), so that the process proceeds to the step S820.

At the time T970, in the step S820, the CPU 110 determines again whether or not the still image photographing start button is in the pressed state at the start of the present frame. Since it is determined that the still image photographing start button is in the pressed state at the start of the frame 6, the answer to the question of the step S820 is affirmative (YES), so that the process proceeds to the step S821. Also at the time T970, it is determined in the step S821 whether or not the next frame is the first frame from the frame (during which this determination is performed) immediately after detection of pressing the still image photographing start button. Since a frame 7 is the fifth frame from the frame immediately after detection of pressing the still image photographing start button, the answer to the question of the step S821 is negative (NO), so that the process proceeds to the step S822.

Also at the time T970, it is determined in the step S822 whether or not the next frame is the second frame from the frame immediately after detection of pressing the still image photographing start button. Since the frame 7 is the fifth frame from the frame immediately after detection of pressing the still image photographing start button, the answer to the question of the step S822 is negative (NO), so that the process proceeds to the step S823. Also at the time T970, it is determined in the step S823 whether or not the next frame is the N-th frame after the last still image photographing. In the present embodiment, since N=3 holds and the frame 7 is the third frame from the last still image photographing, the answer to the question of the step S823 is affirmative (YES), so that the process proceeds to the step S860. After that, at a time T974, update of display on the display section 114 based on the image data of the still image (resolution converted still image 7) in the step S867 is started. The steps S860 to S867 executed from the time T970 to the time T974 are the same as the steps S860 to S867 executed from the time T940 to the time T942.

At a time T980, it is determined in the step S825 whether or not to continue the photographing. The answer to the question of the step S825 is affirmative (YES), so that the process proceeds to the step S820. The steps S840 to S847 executed from the time T980 to a time T984 are the same as the steps S840 to S847 executed from the time T950 to the time T954.

According to the present embodiment, as shown in FIG. 9, if the interval of the image capturing system vertical synchronization signal during moving image photographing except immediately before still image photographing is the time period tA, the interval of the display system vertical synchronization signal before the start of the still image photographing is the time period tA, and the interval of the display system vertical synchronization signal during the still image photographing is also the time period tA. As a result, it is possible to keep constant the update interval of the display section 114. Further, in the moving image photographing not only before but also during the still image photographing, it is possible to suppress time delay before displaying image data on the display section 114. This makes it possible to prevent followability to a fast-moving object from being spoiled in the moving image photographing not only before but also during the still image photographing.

According to the embodiments described hereinabove, it is possible to realize the configurations of the image capturing apparatus described below. Image data (first image data with a first resolution) of a LV image (live view moving image) and image data (second image data with a second resolution) of a still image can be read out from the pixel array 207 by the pixel scanning section 215 (readout section). Further, readout of the image data of the still image from the pixel array 207 is started based on an instruction signal, given by the operation section 116, for starting the readout of the image data of the still image. Image data (image data with a third resolution) is obtained by converting a resolution of the read-out image data of the still image by the resolution conversion circuit 220 (resolution conversion section). The data A output section 222 (output section) is capable of outputting the image data of the LV image and the image data with the third resolution generated by the conversion.

The DSP 108 (generation section) generates display image data based on image data output from the data A output section 222 (output section). The RAM 109 (storage section) stores the generated display image data, and the display section 114 displays the display image data. Then, a storage time period during which the RAM 109 stores the display image data is controlled. This equalizes a time period from the start of a frame to the start of displaying the image data of the LV image by the display section 114 and a time period from the start of the frame to the start of displaying the image data of the still image whose resolution has been converted by the resolution conversion circuit 220 by the display section 114. With this, the live view image is displayed on the display section 114 at a constant interval of the display system vertical synchronization signal.

Further, the storage time period during which the RAM 109 (storage section) stores the display image data is controlled both before and after a timing at which the instruction signal is given by the operation section 116. Thus, the image capturing apparatus has a first mode for equalizing the time period from the start of the frame to the start of displaying the image data of the LV image by the display section 114, and the time period from the start of the frame to the start of displaying the image data of the still image whose resolution has been converted by the resolution conversion circuit 220 by the display section 114.

Further, the storage time period during which the RAM 109 (storage section) stores the display image data is controlled only after the timing at which the instruction signal is given by the operation section 116. Thus, the image capturing apparatus has a second mode for equalizing the time period from the start of the frame to the start of displaying the image data of the LV image by the display section 114, and the time period from the start of the frame to the start of displaying the image data of the still image whose resolution has been converted by the resolution conversion circuit 220 by the display section 114. Furthermore, the image capturing apparatus can be configured such that the operation section 116 includes a mode selection section for switching between the first mode and the second mode.

To sum up the above, before the still image photographing start button is pressed, the CPU 110 makes a display delay time period before the live view image is displayed on the display section 114 shorter than a display delay time period before the still image is displayed on the display section 114. To this end, the CPU 110 controls the storage time period during which the RAM 109 stores the display image data. Then, after the still image photographing start button has been pressed, the CPU 110 controls the storage time period during which the RAM 109 stores the display image data such that the display delay time period before the live view image is displayed on the display section 114 and the display delay time period before the still image is displayed on the display section 114 become equal to each other.

Further, in the first mode, even before the still image photographing start button is pressed, the CPU 110 makes the display delay time period before the live view image is displayed on the display section 114 equal to the display delay time period before the still image is displayed on the display section 114. To this end, the CPU 110 controls the storage time period during which the RAM 109 (storage section) stores the display image data. Further, in the second mode, first, before the still image photographing start button is pressed, the CPU 110 makes the display delay time period before the live view image is displayed on the display section 114 shorter than the display delay time period before the still image is displayed on the display section 114. To this end, the CPU 110 controls the storage time period during which the RAM 109 stores the display image data. On the other hand, after the still image photographing start button has been pressed, the CPU 110 makes the display delay time period before the live view image is displayed on the display section 114 equal to the display delay time period before the still image is displayed on the display section 114. To this end, the CPU 110 controls the storage time period during which the RAM 109 (storage section) stores the display image data.

Further, it is also possible to realize other configurations of the image capturing apparatus as follows: Image data (first image data with a first resolution) of a LV image (live view moving image) and image data (second image data with a second resolution) of a still image can be read out from the pixel array 207 by the pixel scanning section 215 (readout section). Further, readout of the image data of the still image from the pixel array 207 is started based on an instruction signal, given by the operation section 116, for starting the readout of the image data of the still image. Image data (image data with a third resolution) is obtained by converting a resolution of the read-out image data of the still image by the resolution conversion circuit 220 (resolution conversion section). The data A output section 222 (output section) is capable of outputting the image data of the LV image and the image data with the third resolution generated by the conversion.

The DSP 108 (generation section) generates display image data based on image data output from the data A output section 222 (output section). The RAM 109 (storage section) stores the generated display image data, and the display section 114 displays the display image data. The update interval of the display image data to be displayed by the display section 114 is kept constant by controlling changing the start timing of reading out the image data (image data with the second resolution) of the still image. That is, in a case where still image photographing is performed during moving image photographing, the start timing of reading out the image data of the still image from the pixel array 207 is made earlier or later. This causes the live view image to be displayed on the display section 114 at a constant interval of the display system vertical synchronization signal.

Further, it is possible to provide a second operation section which is operated to give a photographing start instruction signal indicative of the start of still image photographing so as to start readout of image data (image data with the second resolution) of a still image from the pixel array 207 based on the photographing start instruction signal. Further, it is also possible to provide a third operation section which is operated to give a ranging operation start instruction signal indicative of the start of a ranging operation so as to start readout of image data (image data with the second resolution) of a moving image for ranging from the pixel array 207 based on the ranging operation start instruction signal. Note that the second operation section and the third operation section may be configured to be included in the operation section 116.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-007148 filed Jan. 20, 2022, which is hereby incorporated by reference herein in its entirety.

What is claimed is:

1. An image capturing apparatus having a live view function, comprising:
 a pixel array that has a plurality of photoelectric conversion elements arranged in a matrix;
 a readout section that is capable of reading out first image data with a first resolution and second image data with a second resolution from the pixel array;
 an operation section that is operated to give an instruction signal indicative of a start of reading out the image data with the second resolution;
 a resolution conversion section configured to convert the image data with the second resolution, which is read out from the pixel array based on the instruction signal, to image data with a third resolution;
 an output section that is capable of outputting the image data with the first resolution, which is read out, and the image data with the third resolution;
 a generation section configured to generate display image data based on image data output from the output section;
 a storage section that stores the display image data; and
 a display section that displays the display image data,
 wherein a storage time period during which the storage section stores the display image data is controlled to thereby equalize a time period from a frame start to a start of displaying the image data with the first resolution by the display section and a time period from a frame start to a start of displaying the image data with the third resolution by the display section.

2. The image capturing apparatus according to claim 1, wherein the image capturing apparatus has a first mode in which the storage time period during which the storage section stores the display image data is controlled both before and after a timing at which the instruction signal is given by the operation section, to thereby equalize the time period from the frame start to the start of displaying the image data with the first resolution by the display section and the time period from the frame start to the start of displaying the image data with the third resolution by the display section.

3. The image capturing apparatus according to claim 2, wherein the image capturing apparatus has a second mode in which the storage time period during which the storage section stores the display image data is controlled only after the timing at which the instruction signal is given by the operation section, to thereby equalize the time period from the frame start to the start of displaying the image data with the first resolution by the display section and the time period from the frame start to the start of displaying the image data with the third resolution by the display section.

4. The image capturing apparatus according to claim 3, further comprising a mode selection section configured to switch between the first mode and the second mode.

5. The image capturing apparatus according to claim 1, further comprising a second operation section that is operated to give a photographing start instruction signal indicative of a start of still image photographing, and
 wherein readout of the image data with the second resolution from the pixel array is started based on the photographing start instruction signal.

6. The image capturing apparatus according to claim 1, further comprising a third operation section that is operated to give a ranging operation start instruction signal indicative of a start of a ranging operation, and
 wherein readout of the image data with the second resolution from the pixel array is started based on the ranging operation start instruction signal.

7. The image capturing apparatus according to claim 1, wherein the first resolution is lower than the second resolution.

8. The image capturing apparatus according to claim 1, wherein the first image data with the first resolution is image data of a live view moving image, and
 wherein the second image data with the second resolution is image data of a still image.

9. An image capturing apparatus having a live view function, comprising:
 a pixel array that has a plurality of photoelectric conversion elements arranged in a matrix;
 a readout section that is capable of reading out first image data with a first resolution and second image data with a second resolution from the pixel array;
 an operation section that is operated to give an instruction signal indicative of a start of reading out the image data with the second resolution;
 a resolution conversion section configured to convert the image data with the second resolution, which is read out from the pixel array based on the instruction signal, to image data with a third resolution;
 an output section that is capable of outputting the image data with the first resolution, which is read out, and the image data with the third resolution;
 a generation section configured to generate display image data based on image data output from the output section;
 a storage section that stores the display image data; and a display section that displays the display image data,
wherein an update interval of the display image data to be displayed by the display section is kept constant by controlling changing a start timing of reading out the image data with the second resolution.

10. The image capturing apparatus according to claim 9, wherein substitute image data is displayed by the display section in a predetermined frame after a timing at which the instruction signal is given by the operation section.

11. The image capturing apparatus according to claim 9, wherein the substitute image data is image data formed by changing luminance of image data in the predetermined frame.

12. The image capturing apparatus according to claim 9, wherein the substitute image data is image data unrelated to image data in the predetermined frame.

13. The image capturing apparatus according to claim 9, further comprising a second operation section that is operated to give a photographing start instruction signal indicative of a start of still image photographing, and
wherein readout of the image data with the second resolution from the pixel array is started based on the photographing start instruction signal.

14. The image capturing apparatus according to claim 9, further comprising a third operation section that is operated to give a ranging operation start instruction signal indicative of a start of a ranging operation, and
wherein readout of the image data with the second resolution from the pixel array is started based on the ranging operation start instruction signal.

15. The image capturing apparatus according to claim 9, wherein the first resolution is lower than the second resolution.

16. The image capturing apparatus according to claim 9, wherein the first image data with the first resolution is image data of a live view moving image, and
wherein the second image data with the second resolution is image data of a still image.

17. A method of controlling an image capturing apparatus having a live view function, comprising:
reading out first image data with a first resolution from a pixel array having a plurality of photoelectric conversion elements arranged in a matrix;
reading out second image data with a second resolution from the pixel array;
giving an instruction signal indicative of a start of reading out the image data with the second resolution in response to an operation performed on an operation section;
converting the image data with the second resolution, which is read out based on the instruction signal, to image data with a third resolution;
outputting the image data with the first resolution, which is read out;
outputting the image data with the third resolution;
generating display image data based on the image data with the first resolution, which is output, or the image data with the third resolution, which is output;
causing the display image data to be stored in a storage section;
causing the display image data to be displayed on a display section; and
equalizing a time period from a frame start to a start of displaying the image data with the first resolution, and a time period from a frame start to a start of displaying the image data with the third resolution, by controlling a storage time period during which the display image data is stored in the storage section.

18. A method of controlling an image capturing apparatus having a live view function, comprising:
reading out first image data with a first resolution from a pixel array having a plurality of photoelectric conversion elements arranged in a matrix;
reading out second image data with a second resolution from the pixel array;
giving an instruction signal indicative of a start of reading out the image data with the second resolution in response to an operation performed on an operation section;
converting the image data with the second resolution, which is read out from the pixel array based on the instruction signal, to image data with a third resolution;
outputting the image data with the first resolution;
outputting the image data with the third resolution;
generating display image data based on the image data with the first resolution, which is output, or the image data with the third resolution, which is output;
causing the display image data to be stored in a storage section;
causing the display image data to be displayed on a display section; and
keeping constant an update interval of the display image data to be displayed by the display section, by controlling changing a start timing of reading out the image data with the second resolution.

\* \* \* \* \*